United States Patent [19]
Eggert

[11] 3,857,648
[45] Dec. 31, 1974

[54] MOLDED PLASTIC CONTAINER SECONDARY OPERATIONS MACHINE

[75] Inventor: Noel B. Eggert, Toledo, Ohio

[73] Assignee: Owens-Illinois, Inc., Toledo, Ohio

[22] Filed: Nov. 29, 1972

[21] Appl. No.: 310,392

Related U.S. Application Data

[62] Division of Ser. No. 93,069, Nov. 25, 1970, Pat. No. 3,716,910.

[52] U.S. Cl. .................................. 408/17, 408/105
[51] Int. Cl. ...................... B23b 39/06, B23b, 41/00
[58] Field of Search ............ 408/67, 84, 95, 17, 106, 408/105, 104, 103; 144/205; 29/33 P, 563

[56] References Cited
UNITED STATES PATENTS

| | | | |
|---|---|---|---|
| 667,880 | 2/1901 | Hinckley et al. | 408/106 |
| 2,631,480 | 3/1953 | Romine et al. | 408/705 X |
| 2,768,539 | 10/1956 | Wollenhaupt et al. | 408/17 X |
| 2,948,196 | 8/1960 | Brandlay | 144/205 X |
| 3,228,086 | 1/1966 | Brown et al. | 29/33 P |
| 3,475,997 | 11/1969 | Wohlfeil | 318/603 X |

*Primary Examiner*—Andrew R. Juhasz
*Assistant Examiner*—Z. R. Bilinsky
*Attorney, Agent, or Firm*—Philip M. Rice; E. J. Holler

[57] ABSTRACT

A method and apparatus is provided for performing secondary operations on plastic containers including deflashing, machining, leak detecting and dimension checking. The assemblies for performing these secondary operations are synchronized and designed to enable sequential operations to each of a continuing succession of containers to enable more and faster operations than in the past. A transfer mechanism indexes the containers between operation stations. Defective containers are rejected as the containers emerge from the processing apparatus.

7 Claims, 37 Drawing Figures

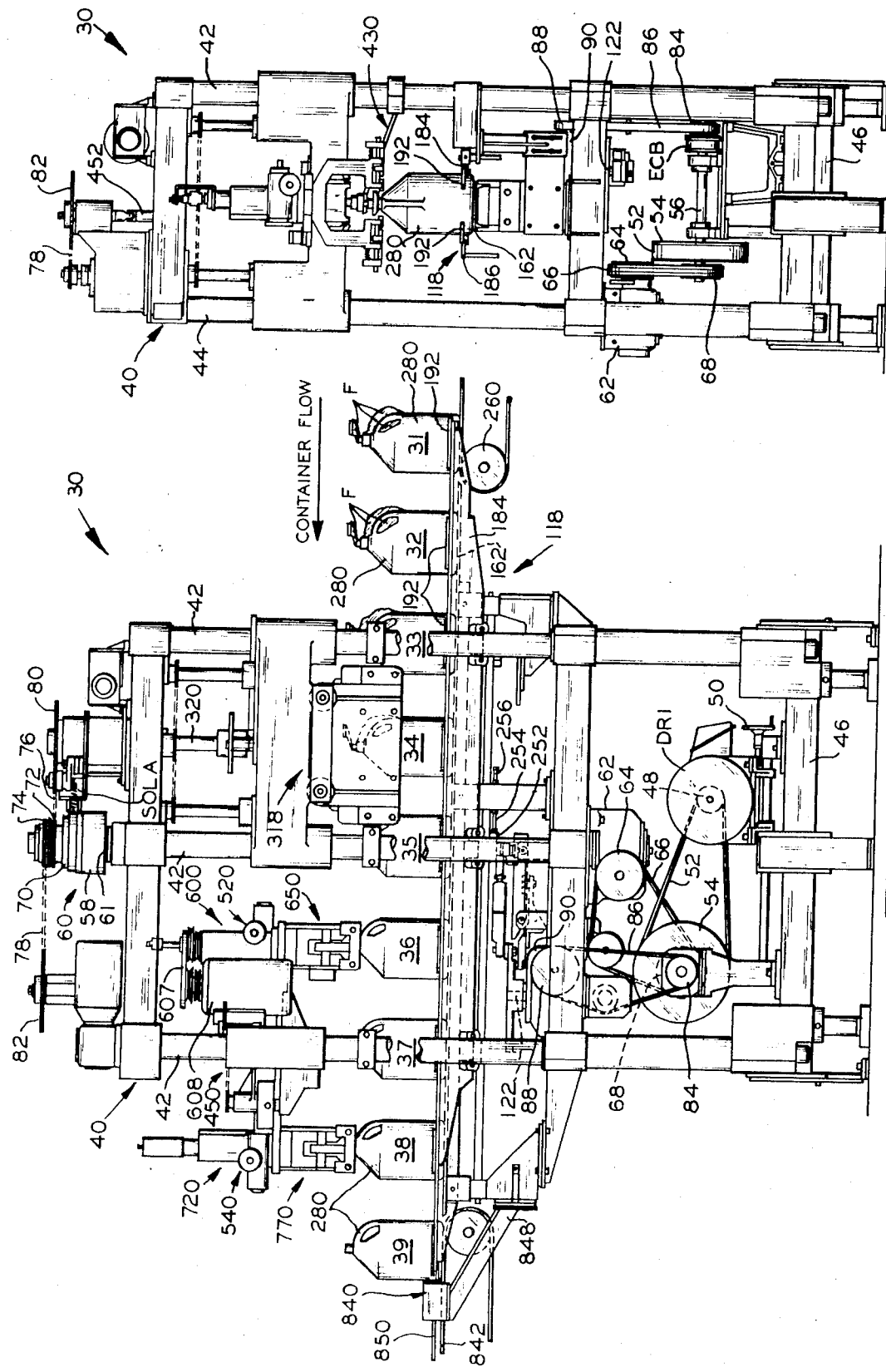

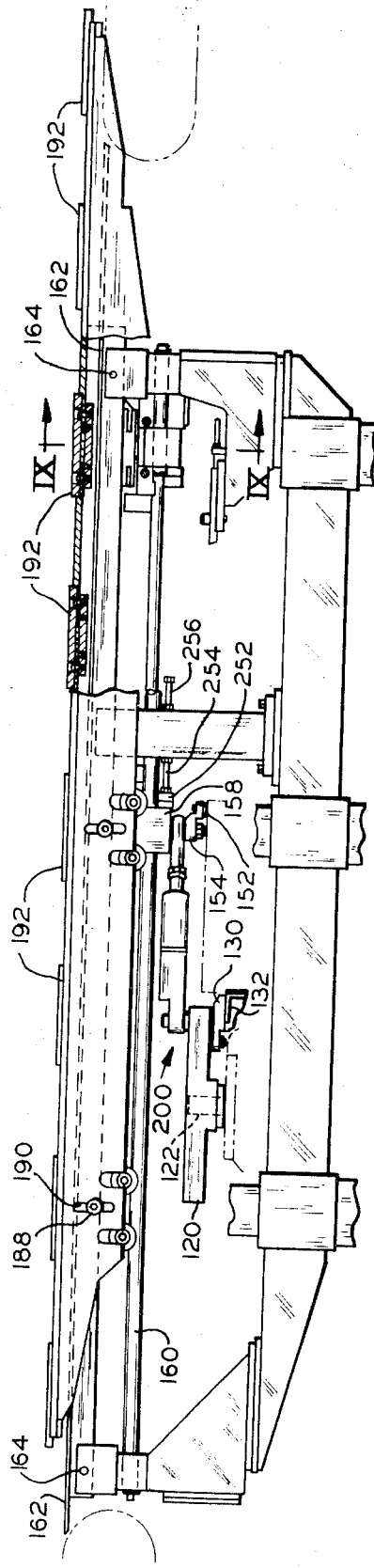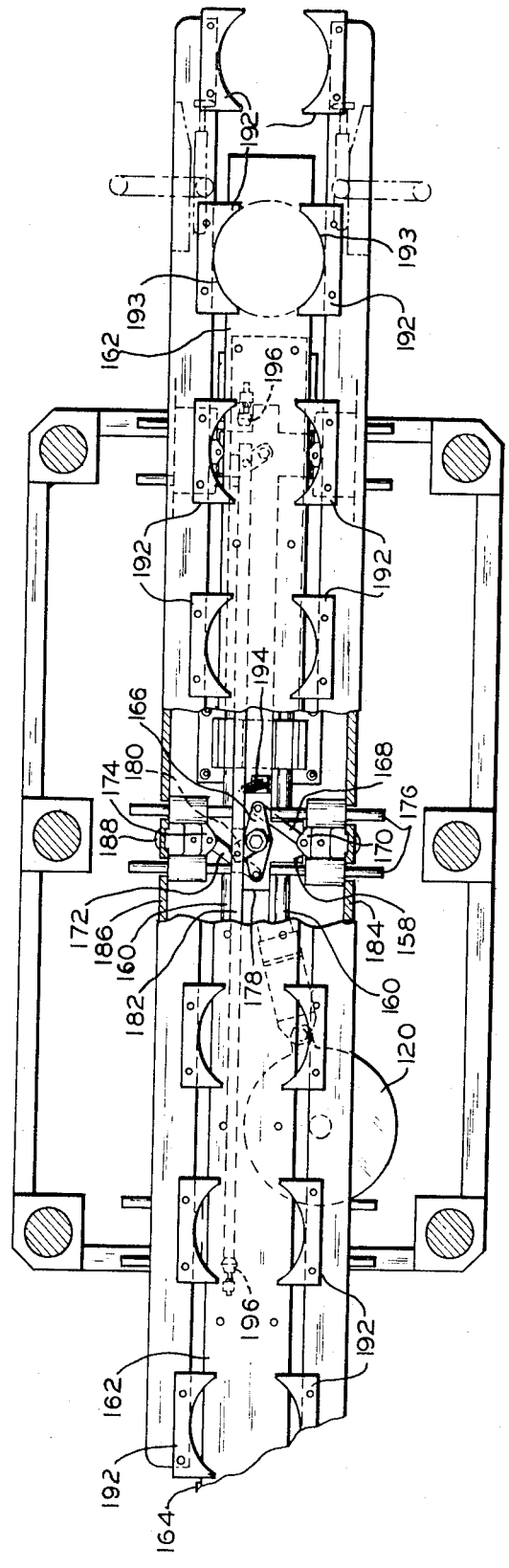

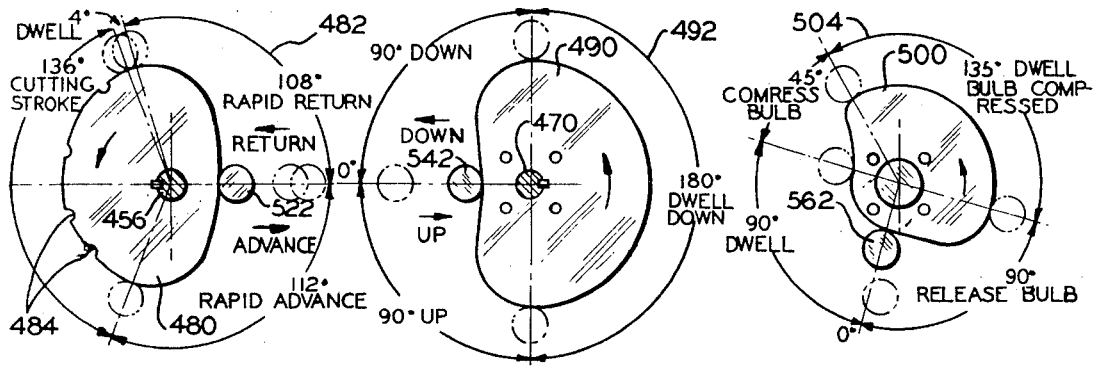
FIG. 21    FIG. 22    FIG. 23
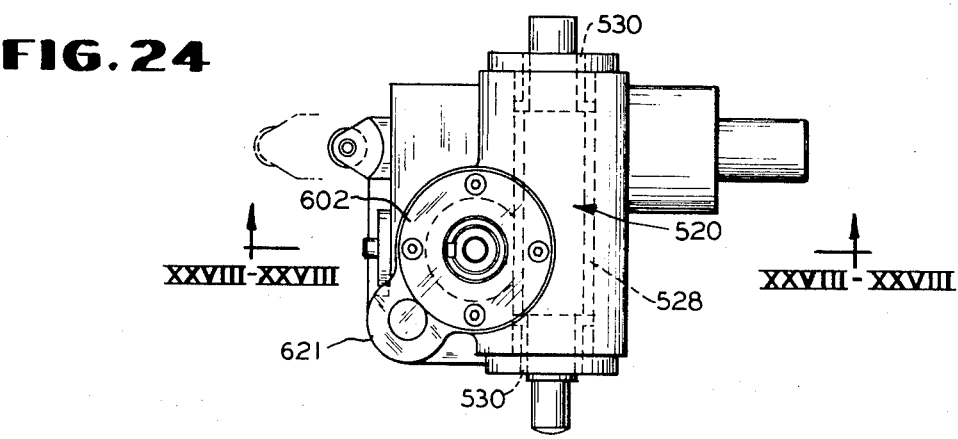
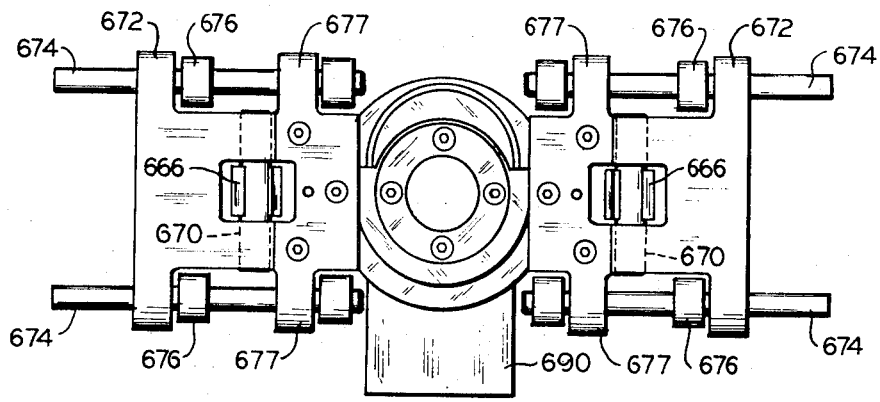
FIG. 26

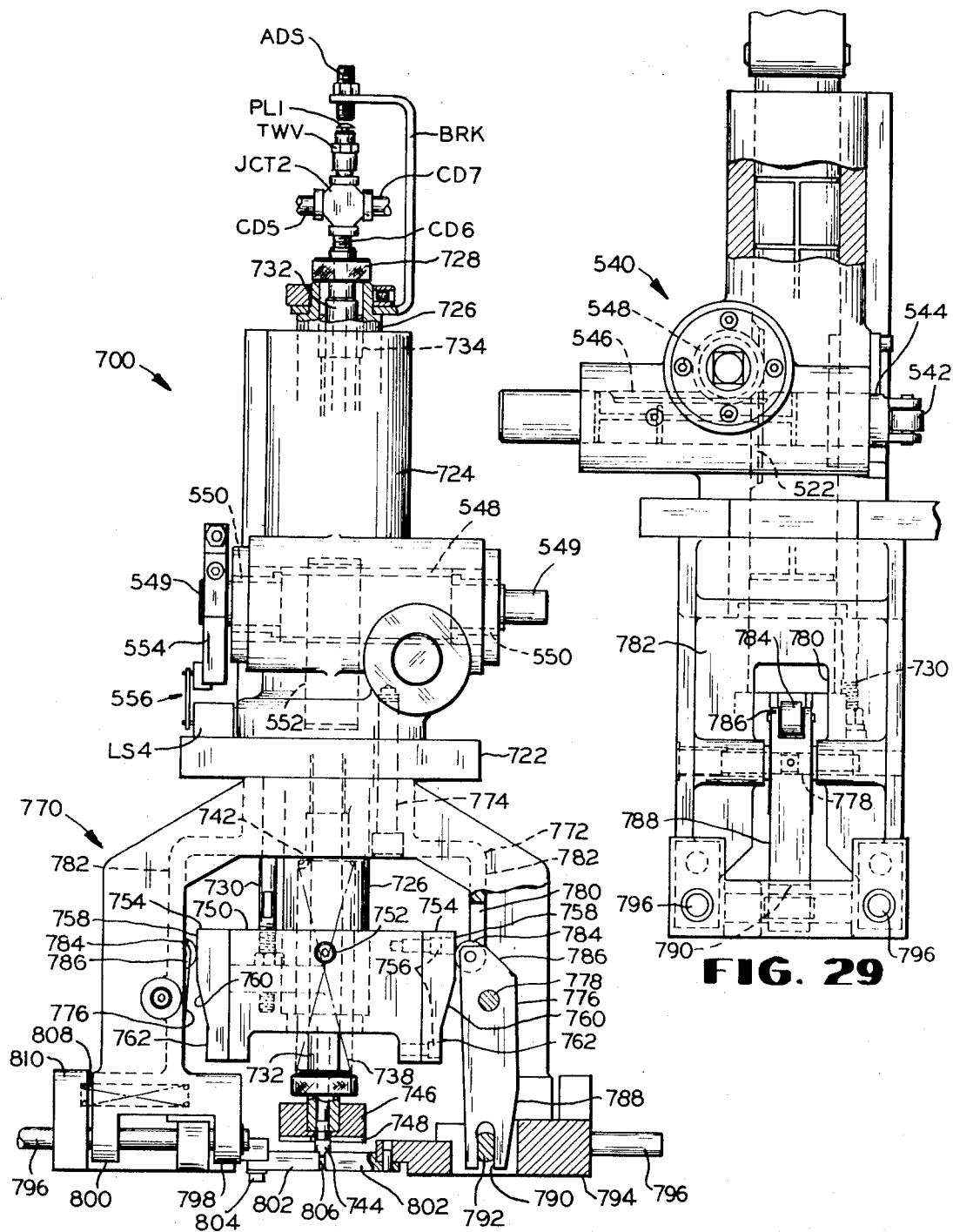

MOLDED PLASTIC CONTAINER SECONDARY OPERATIONS MACHINE

CROSS REFERENCE TO RELATED APPLICATION

This is a division of application Ser. No. 93,069, filed Nov. 25, 1970 now U.S. Pat. No. 3,716,910.

BACKGROUND OF THE INVENTION

For convenience, certain terms employed in the specification are defined as follows.

The term "flash" refers to a finlike web which projects from the surface of the article. Flash is formed in the molding operation by material which is caught between the closing mold halves or forced between the mold half faces during the molding operation.

The term "moil" refers to the plastic left from the original gob after the container has been blown in the mold and severed from the supply. In the present case the moil extends upwardly from the finish neck portion of the bottle.

While the invention will be described specifically with respect to performing secondary operations on a molded plastic bottle having an integrally molded handle, it will become apparent from the description that the invention is applicable to other types of molded articles. The molded plastic bottle having a handle has been chosen as a specific example since this particular article presents a wide variety of problems in performing secondary operations thereon.

In the molding of plastic bottles of the foregoing type, the neck or finish of the bottle is first injection molded and a tubular parison is formed, or the tubular parison is formed and the neck or finish is blown in the molds. The parison is then positioned in operative alignment with a pair of blow mold halves which are then closed upon the parison. The interior of the tubular parison is then pressurized to expand the parison into contact with the mold walls. In the formation of handled bottles, the tubular parison is initially expanded prior to the closing of the mold to make sure that the handle portion of the mold will close upon a portion of the parison. This inherently requires that the closing mold halves grip between them some of the plastic material of the parison, thereby resulting in a web of plastic material within the handle opening at the conclusion of the molding process. Additionally, as the mold closes, a certain amount of the parison is caught between the closing mold faces in the region of the shoulder, thus resulting in projecting fins on the shoulder of the completed article. The projecting fins and the web within the handle opening are referred to below generally as "flash."

In the forming of plastic bottles, problems are frequently encountered by the presence of minute pin holes in the bottles. Although not readily discernible to the eye, the presence of such pin holes is reason for rejecting the bottle.

Accordingly, it is necessary that plastic bottles be tested to determine whether such bottles have pin holes which would present problems if the bottle were used for pacakaging goods. The bottles are customarily tested by introducing therein fluid pressure from an outside source and waiting a period of time to see whether such pressure is lost through pin holes contained in the bottle.

The plastic containers have also had to be individually dimensionally checked, particularly to see whether the finished height of the container was within a desired tolerance. This is necessary because the containers may be passed through automatic container filling machines, packaging mamchines, etc., and a container that is too short or too tall may cause an automatic machine to malfunction.

Various machining operations are also performed on plastic containers to face, ream, chamfer, or otherwise finish particular portions of the containers.

Individual machines have been designed to individually perform the secondary operations discussed, some of which have been operated relatively successfully. However, there are container handling and orienting problems when the containers are moved from machine to machine for each operation. Further, individual machine operations are relatively slow because the containers must be handled and re-oriented between machines and because the operations of one machine were not timed with respect to the operations of the next machine. Moreover, individual machines for each operation are more expensive, occupy more valuable floor space, require more operator attention, and cause more control problems.

In addition, since the plastic used in manufacturing some containers tends to change dimensionally in response to temperature changes, e.g., after it cools on emerging from the mold, it is important that seconary operations be performed quickly after molding, and/or rapidly with respect to each other, so that the secondary operations can be performed on the container while it is in a particular dimensional range to enable more accurate results from the secondary operations without adjusting individual machines.

Accordingly, it is an object of this invention to provide novel apparatus for performing several secondary operations on plastic containers, the operations being sequentially performed in the apparatus which synchronizes the operations with respect to each other mechanically, pneumatically, and electrically.

It is a further object of this invention to provide improved deflasher, machining, leak detecting and dimension checking assemblies which are novel and useful separately, or which may be combined as shown.

It is a still further object to provide an improved transfer mechanism for moving or indexing containers or other objects between stations.

It is another object of this invention to provide an improved method of and apparatus for performing secondary operations on molded plastic articles.

Other objects, advantages and features of this invention will become apparent when the following description is taken in conjunction with the accompanying drawings, in which:

FIG. 1 is a side elevational view of apparatus embodying the teachings of this invention taken from the left side of container flow from the loading station through the apparatus;

FIG. 2 is an end elevational view taken from the downstream side of the apparatus illustrated in FIG. 1;

FIG. 7 is a side elevational view of the transfer mechanism emphasizing the clamp rails and apparatus for moving same;

FIG. 8 is a plan view, partially in section, of the apparatus illustrated in FIG. 7;

FIG. 21 is an enlarged view of the facing spindle feed cam and includes a graphic representation of its cyclic operation;

FIG. 22 is an enlarged view of the leak detector assembly feed cam and includes a graphic representation of its cyclic operation;

FIG. 23 is an enlarged view of the bellows compressing cam and includes a graphic representation of its cyclic operation;

FIG. 24 is a plan view of the facer assembly;

FIG. 26 is a bottom view of the facer assembly illustrated in FIG. 25;

FIG. 29 is a side elevational view of the leak detector and dimension checking assembly, partially in section, taken from the left side of the machine;

FIG. 30 is an end elevational view of the assembly illustrated in FIG. 29, partially in section, looking upstream toward the container flow;

SUMMARY OF THE INVENTION

Figure 3:
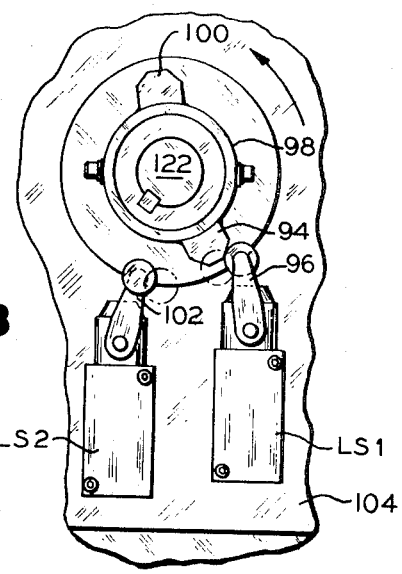
FIG. 3 is a bottom view of means for determining the index position of the transfer mechanism.

Referring to the drawings there is illustrated in FIG. 1 a side elevational view taken from the left of the center line of container flow through the apparatus and in FIG. 2 an end elevational view taken from a downstream side of FIG. 1, a general assembly layout of a machine 30 incorporating the teachings of this invention.

The machine 30 is designed to accept blown plastic containers 280 and perform secondary operations of deflashing, facing or other machining work, dimensional checking, and leak detection. The containers 280 are then deposited on an unloading conveyor or other removal means. Containers not within the dimensional or leak detection tolerances are ejected from the unloading conveyor and the remaining containers are conveyed to packing, filling, or other container use areas.

To perform these operations the preferred embodiment of the machine 30 includes nine in-line stations which are noted in FIG. 1 as load station 31, orientation station 32, idle station 33, deflash station 34, idle station 35, facing or other machining station 36, idle station 37, leak detection and dimensional checking station 38, and unload station 39.

The assembly and mechanism at each station will be described in detail hereinafter. However, to provide an initial understanding of the machine functions, the operations at each station are set forth briefly here.

Containers 280 are delivered to load station 31 by an endless belt conveyor 260. An escapement mechanism blocks free entry of containers 280 into the load station causing the containers to accumulate in a column on conveyor 260. The escapement mechanism releases one container at a time to the load station in synchronization with the operation of an in-line transfer mechanism designated generally at 118 which moves or indexes individual containers from station to station. A container detection unit monitors the presence or absence of containers available at the load station and generates a signal in response to the lack of containers which may be utilized to shut down completely or temporarily halt the operation of the entire machine until one or more containers are again available at the load station.

the containers are properly oriented at the orientation station 32 for subsequent operations at succeeding stations. No specific orienting mechanism is described herein but an orienting means similar to that disclosed in U.S. Pat. No. 3,377,899, issued Apr. 16, 1968, may be utilized and the description thereof is incorporated herein by reference thereto.

Alternatively, the containers may be oriented by the above-referenced orienting means or other suitable means before reaching the load station 31, since the orientation may be maintained by the transfer mechanism 118 described herein.

Idle stations 33, 35, and 37 may be utilized as shown herein to increase the distance between work stations while maintaining a short indexing distance for the transfer mechanism 118. This increases the number of work operations that may be performed in a given period of time since less time is required to transfer containers into and out of work stations. Means may be provided at each idle station, as described hereinafter, to maintain the orientation and stability of containers at the idle stations.

Excess flash material and moil F are removed from each container at deflash station 34. Two nest platens carry nest tooling shaped to close around a container, when the nest platens advance toward each other, to hold the container in trimming position. After the container is grasped by the nest toolings a third platen carrying trim knife tooling completes an inward stroke, that was initiated at the same time the nest platens started to advance, to cut off the flash and moil.

Although station 36 will be referred to herein as the facing station, it should be understood that any one of a number of machining or finishing operations may be performed at this station including facing, chamfering, reaming, etc. In response to the lowering of a tool carrying housing or quill, container gripping clamps are advanced from the sides to grasp and hold the container. The container is preferably clamped around the neck portion which is usually relatively more rigid than the rest of the container. The clamping is accomplished before the facing tool reaches the container and is continued until after the facing tool is withdrawn from the container.

The leak detection and dimensional checking station 38 includes means for clamping the container in response to the lowering of a pressurizing nozzle and closure sealing unit. The container is clamped before pressurization and is released after the nozzle and sealing unit is withdrawn. While the container is pressurized a pressure test sensor checks for container leaks and in response to a detected leak generates a reject signal. If the height of the neck is too low, the container cannot be pressurized and the pressure test sensor generates a reject signal. If the height of the neck is too high, a plunger on top of the leak detector actuates a valve to exhaust pressure from the container, again causing the pressure test sensor to generate a reject signal.

The unload station 39 includes an endless belt conveyor for receiving and removing a container indexed forward from station 38 by the transfer mechanism. If the container which has just been indexed to the unload station 39 has passed all of the tests at station 38, then the unload conveyor moves the good container to another area. If the container just indexed to the unload station 39 has failed any of the tests at station 38, an eject mechanism will remove the defective container from the unload conveyor in response to the reject signal generated at the test station.

GENERAL ASSEMBLY

The machine 30 includes a frame designated generally at 40 which includes three vertical posts 42 on the left and three vertical posts 44 on the right of the flow of the containers rigidly held in their assembled position by crossbraces or other rigid framework. Various parts of the frame 40 have been omitted or shown only as a portion or section in these and the remaining figures since the framework may take any suitable form and, unless discussed specifically, does not by itself form part of the invention.

A transfer mechanism indicated generally at 118 includes a fixed, smooth conveyor bed 162 extending from adjacent the loading conveyor 260 along the stream of flow of the containers beneath the intermediate operation and idle stations 32 to 38 and between the left and right sets of posts 42, 44 to a position adjacent the unloading conveyor 842. The fixed conveyor bed 162 is attached by suitable means to portions of the frame as described hereinafter, and supports the bottom of the containers while at the stations 32 to 38 and while the containers are being indexed from station to station.

The transfer mechanism also includes left and right clamp rails 184, 186 which carry opposed pairs of container clamps 192 which grip and move the containers from station to station in response to the actions of transferring and indexing apparatus which will be described in detail later.

A main drive motor DR1 is mounted on a subframe assembly 46 and drives a variable diameter pulley 48. The effective diameter of the pulley 48 may be changed by rotation of wheel crank 50 through a diameter changing mechanism known in the art. Thus the motor DR1 and the pulley 48 constitute a variable speed drive assembly for changing the speed of operation of the mechanisms driven by motor DR1.

A belt 52 is connected between pulley 48 and a pulley 54 secured on a drive distribution shaft 56 journally mounted on sub-frame 46. The distribution drive shaft 56 transmits rotational drive to a constantly rotating portion 58 of a one revolution clutch assembly 60 on top of the frame 40 via a shaft 62 extending down from clutch unit 60 through the middle right frame post 44 to a gear box 62 below post 44. A pulley 64 and belt 66 connect the gear box 62 to the pulley 68 on the distribution drive shaft 56.

An upper portion 70 of clutch unit 60 may be engaged by the energization of solenoid SOLA to turn shaft 320 of the deflasher station assembly 318 and shaft 452 of the facer and leak detector carrier assembly one revolution each. The single revolution is imparted by clutch unit 60 to shafts 320 and 452 via sprockets 72, 74 on the unit 60 connected by chains 76, 78 to sprockets 80, 82 driving shafts 320, 452, respectively.

The distribution drive shaft 56 may be connected through an electric clutch-brake unit ECB to drive a pulley 84. A belt 86 is connected between pulley 84 and a pulley 88 on a gear box 90 to rotate a shaft 122 which extends vertically above and below the gear box 90. The upper end of the shaft 122 carries a face cam control disc 120 which controls the action of the transfer mechanism. The lower end of the shaft 122 carries cams for actuating limit switches to indicate the index position of the transfer mechanism.

Figure 4:
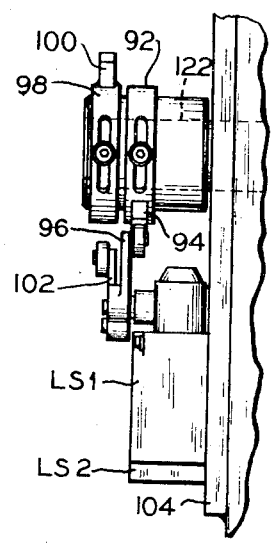
FIG. 4 is a side elevational view of the apparatus illustrated in FIG. 3.

Referring to FIGS. 3 and 4 there is illustrated an index position cam-switch assembly which includes a first cam 92 fixedly secured to shaft 122 and having a cam surface 94 projecting therefrom to engage a cam follower assembly 96 once each revolution of the shaft 122 and actuate a limit switch LS1 mounted on a plate 104 attached to the frame. The cam surface projection 94 is positioned with respect to the location of the control disc 120 on the other end of the shaft 122 so that when the transfer mechanism is at the end of an index back or rear stroke the cam surface 94 engages cam follower 96 to open a first set of limit switch contacts LS1 and close a second set of limit switch contacts LS1. Since there is a dwell period between an index back and an index forward stroke, as will be explained hereinafter, the cam surface 94 continues rotation during the dwell period. At the end of the dwell period and before the index forward stroke begins, the cam surface 94 will rotate past the cam follower 96 and permit the cam follower to return to its original position, as shown in dashed lines. When the cam follower 96 returns to its original position, the first set of LS1 contacts wll close and the second set of LS1 contacts will open.

Similarly, a cam surface 100 of a cam 98 is secured on the shaft 122 in a fixed position with respect to the control disc 122 so that a cam follower assembly 102 will actuate a first set of limit switch contacts LS2 closed and a second set of LS2 contacts open at the end of an index forward stroke. As the dwell period expires the cam surface 100 will rotate past the cam follower 102 to permit the first set of limit switch contacts LS2 to open and the second set of LS2 contacts to close.

The function of the sets of limit switch contacts LS1, LS2 will be explained hereinafter in the description of the electrical control circuit for the apparatus.

TRANSFER MECHANISM

Figure 5:
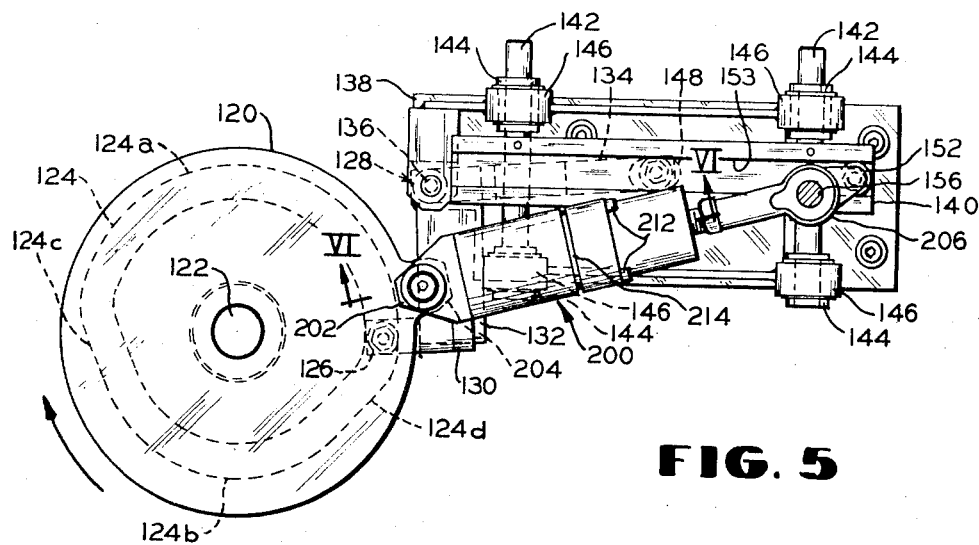
FIG. 5 is a plan view of the index control portion of the transfer mechanism.
Figure 6:
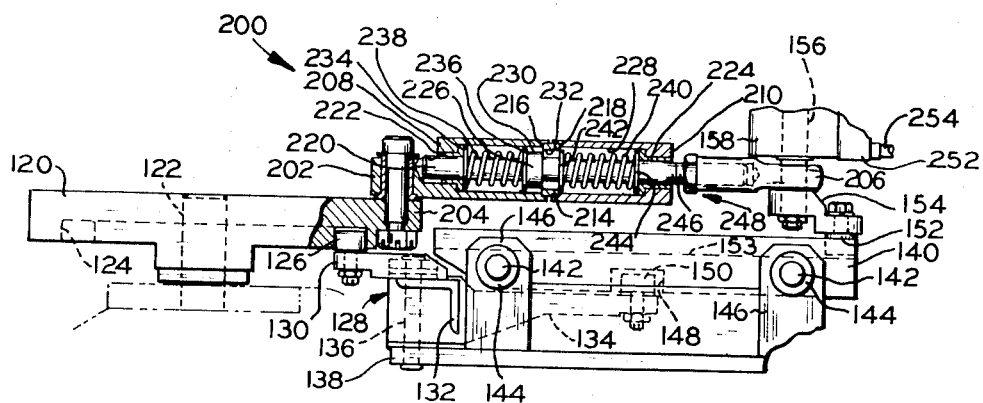
FIG. 6 is a side elevational view of the apparatus illustrated in FIG. 5, partially in section taken along lines VI—VI in FIG. 5.
Figure 9:
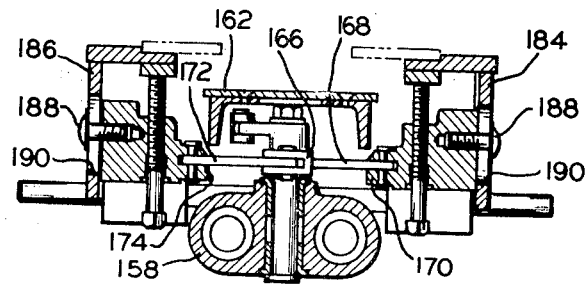
FIG. 9 is a sectional view of the apparatus illustrated in FIG. 7 taken along lines IX—IX of FIG. 7.

Referring to FIGS. 5 through 9, and particularly FIGS. 5 and 6 it can be seen that transfer mechanism includes the following.

A face cam control disc 120 is key mounted on drive shaft 122 extending upwardly from the gear box 90 described hereinbefore. The disc 120 has a cam track or groove 124 formed in the underface thereof and receives therein a cam roller 126. A cam follower designated generally at 128 is a three arm bell crank system having a first arm 130 rotatably supporting the cam roller 126, a second arm 132 and a third arm 134. A pivot pin 136 at the junction of the second and third arms 132, 134 pivotally supports the bell crank or cam follower 128 on a frame portion 138.

A cam rail 140 is mounted by set screws or the like on a pair of spaced shafts 142 which are supported for transverse sliding movement in spaced pairs of bushings 144 carried by frame portions 146. A cam slot 148 is formed in the underside of the cam rail 140 and receives a cam roller 150 which is rotatably carried on the end of arm 134 of the bell crank 128.

A second cam roller 152 is associated with the cam rail 140 and is received in a linear cam slot 153 formed along the length of and in the upper side of the cam rail 140. The cam roller 152 is rotatably suspended from an arm 154 which is key mounted on a shaft 156 vertically and pivotally supported in a centrally located indexing member 158 (best seen in FIG. 7). The indexing member 158 is slidably mounted on a pair of spaced index shafts 160 running the length of the transfer mechanism below the fixed conveyor bed 162. The fixed conveyor bed 162 preferably is formed with a smooth, long-wearing, metallic upper surface which offers little resistance to the sliding of the plastic bottles or containers along its length in response to the indexing of the bottles from station to station. The bed 162 may be secured to the frame by bolts 164 on each side and at the ends thereof.

A rocker arm 166 (best seen in FIG. 8) is key mounted at the midpoint thereof on the shaft 156 above the indexing member 158 and is positioned on the shaft 156 to extend along the line of travel of the bottles through the machine when opposing bottle clamps 192 are closed. A left clamp rail control arm 168 is pivotally connected between one end of the rocker arm 166 and a left clamp rail support 170. A right clamp rail control arm 172 is pivotally connected between the other end of the rocker arm 166 and a right clamp rail support 174. The left and right clamp rail supports 170, 174 are slidably mounted on a pair of spaced shafts 176 extending transversely beneath the conveyor bed 162. The shafts 176 are supported in spaced relationship in an indexing rail means 178 attached to the indexing support member 158.

A synchronizing arm 180 is key mounted on the shaft 156 above the rocker arm 166 and extends obliquely and forwardly with respect to the line of travel of the bottles and has its forwardly extending end connected to a clamp synchronizing rod or arm 182 extending to similar clamp "open" and "close" stations forward of and to the rear of the central station shown in FIG. 8.

A left clamp rail 184 and a right clamp rail 186 may be secured to the left and right clamp rail supports 170, 174 by bolts 188 extending through vertical adjustment slots 190 formed in the downwardly extending sides of the clamp rails. A plurality of opposing pairs of bottle clamps 192 are mounted on top of the clamp rails 184, 186 and extend toward each other to engage the bottles to be indexed.

In the bottle clamp "open" and "close" operation, the face cam control disc 120 rotates in a clockwise direction. The cam roller 126 is displaced inwardly toward the center of the disc 120 from the position shown in the plan view of FIG. 5 from the arcuate track portion 124a with the larger radius to an arcuate track portion 124b with a smaller radius, through a connecting or intermediate track portion 124c. This displacement of the cam roller 126 moves the arm 130 of the bell crank 128 toward the center of the disc 120, causing the end of arm 134 and the cam roller 150 to move to bear against the left side of slot 148 to move the cam rail 140 from a position to the right of the center line of the flow of bottles as shown in FIG. 5 to a corresponding position on the left of the center-line.

Similarly, as the cam roller 126 reaches the end of the arcuate portion 124b of the track 124 it is displaced outwardly from the center of the disc 120 via a connecting track portion 124d back to the arcuate track portion 124a. The outward displacement of the cam roller 126 now acts in a reverse manner through the bell crank 128 to move the cam rail 140 transversely from the left position to its original position to the right of the center line of the flow of bottles.

Since the track portions 124a and 124b each have a constant radius throughout their length there is no displacement of the cam roller 126 while those portions of the track are traveling past the roller 126 and thus there is no movement of the cam rail 140.

When the cam track or slot 153 and the cam rail 140 is shifted from the position to the right of the line of travel of the bottles shown in FIG. 5 to a corresponding position to the left of the line of travel, the cam roller 152 is acted on by the right side of the cam slot 153 in the upper side of rail 140. This action rotates the shaft 156 and thus also rotates the rocker arm 166 and the synchronizing rod 180 in a clockwise direction about the axis of the shaft 156.

The rotation of the rocker arm 166 about its midpoint moves the ends thereof in a clockwise direction to apply force through the left and right clamp rail control arms 168, 172 to move the left and right clamp rail supports 170, 174 transversely and outwardly on the shafts 176. The left and right clamp rails 184, 186 carried on the supports 170, 174 thus also move outwardly and separate the clamps 192 carried thereon.

The opposing pairs of bottle clamps 192 are secured to the upper side of the clamp rails 184, 186 and extend toward each other. The opposing inner faces of the bottle clamps 192 have recesses 193 formed therein that will accommodate and substantially mate with the external configuration of the bottle being held or grasped. In this instance, since that portion of the bottle being grasped is cylindrical, the inner faces or recesses 193 at least partially define an arc of a circle having a diameter substantially the same as the outside diameter of the bottle.

The opposing pairs of clamps 192 are spaced apart along the length of the clamp rails 184, 186 a distance equal to the distance between each operation station and/or idle station of the machine along the length of the conveyor bed 162. The outward transverse movement of the supports 170, 174 and rails 184, 186 opens all pairs of clamps, leaves each bottle at the desired station and permits the clamp rails 184, 186 to be indexed back.

Movement of the cam slot 153 in the cam rail 140 from the left side of the centerline of travel back to the right side thereof will reverse the operation just described and will close the clamps 192. This cam rail movement does not occur, however, until the index mechanism has moved the clamp rails 184, 186 and the opposed pairs of open clamps 192 back one station so that each succeeding bottle may be grasped for indexing forward one station.

The clamp opening and closing operation just described for the centrally located clamp operation mechanism may be translated through the synchronizing arm 180 and the rod 182 to one or more similar clamp operating mechanisms located to the rear of or forward of the central mechanism. It is to be understood that other synchronizing arms similar to the arm 180 are pivotally connected to the rod 182 at one end thereof and key mounted on a shaft similar to the shaft 156 which carries a similar rocker arm connected to similar left and right clamp control arms for moving similar left and right clamp rail supports which may be secured to the left and right clamp rails 184, 186, respectively.

Springs 194 may be connected between a support on the indexing rail means 178 and the rod 182 to bias the clamp synchronizing rod 182 and thus the clamp rails 184, 186 and the clamps 192 to the clamp closed or clamp opened position once the midpoint of travel of the arm 180 is reached. The springs 194 thus provide a positive, snap action to the opening and closing of the bottle clamps 192.

Stop spindles 196 may be secured to the frame at each end of the rod 182 to provide positive stop points and positioning for the reciprocal travel of the rod 182.

Referring now to the mechanism for indexing the clamp rails on forward and return strokes there is best shown in FIGS. 5 and 6 a tie rod assembly 200 having a first end 202 pivotally connected to projection 204 extending from the circumference of the index control disc 120, and a second end 206 pivotally connected to the shaft 156. The tie rod assembly 200 includes a two-piece housing indicated at 208 and 210, the members 208, 210 being connected by bolts 212. An annular spacing and aligning member 214 is received by counter bores 216 and 218 formed in the facing ends of housing members 208, 210.

A shaft 220 is slidably mounted in bearings 222 and 224 seated at opposite ends of housing members 208, 210, respectively. A collar 226 is formed on or secured to shaft 220 at about the midpoint of shaft 220 in the chamber 228 formed by the hollow housing members 208, 210, when the tie rod assembly 200 is in a relaxed condition. The outer diameter 230 of the collar 226 is smaller than the inner diameter 232 of the opening in the annular member 214 to permit collar 226 to reciprocate back and forth therethrough.

Spring seat washers 234 and 236 are slidably mounted on the portion of shaft 220 in the housing portion 208 and retain in a compressed or preloaded condition a spring 238 therebetween, since the seats abut against the bearing 222 and the collar 226. Similarly, coil spring 240 in the housing portion 210 is retained in a preloaded or compressed condition by slidably mounted spring seat washers 242 and 244 on the shaft 220, the seats abutting against the collar 226 and the bearing 224.

Although the inner diameter 232 of annular member 214 is large enough to permit free passage of collar 226, the inner diameter 232 is smaller than the outer diameter of spring seat washers 236 and 242. This permits annular member 214 to function as a stop member during the dwell periods of the transfer mechanism to be described hereinafter.

A portion 246 of the shaft 220 extending from the housing piece 210 is threaded to permit connection of the shaft 220 to internal threads of the connecting assembly 248 on the end 206 of the tie rod 200 which is pivotally connected to the shaft 156.

In operation of the indexing mechanism, the rotation of the index control disc 120 in a clockwise direction moves end 208 of the tie rod assembly 200 pivotally connected to the projection 204 of disc 120 in a circle, causing the other end 206 to move the shaft 156 and the centrally located indexing support member 158 in a reciprocating stroke along index shafts 160.

By offsetting the center of the index control disc 120 to one side of the center line of the travel of the indexing member 158 the rotation of the disc 120 less than one-half of a circle of rotation is sufficient to move the indexing member 158 and the clamp rails 184, 186 the entire transfer distance required between stations. In an experimental model only approximately 110° rotation of the disc 120 was required to index a grasped bottle forward to the next station. Therefore, the percentage portion of a cycle during which the machine 30 can perform actual work operations is increased substantially since less than one-half of a cycle is required to index the bottles forward. Many more machine operations are enabled during a given period of time since the time of a complete cycle can be reduced while still maintaining the same amount of effective work time within a complete cycle.

Another feature of the indexing mechanism permits a dwell period at the end of each stroke forward and at the end of each return stroke back, to enable the bottle clamp opening and bottle clamp closing operations hereinbefore described to occur while the clamp support rails are stationary at the end of each stroke. This is possible because the tie rod assembly 200 is constructed as described with the preloaded springs 238, 240 which permit limited axial movement of the shaft 220 when a force is applied which exceeds the preload force exerted by the springs.

Just before the end 206 of the tie rod assembly 200 approaches the natural finish of an index return or back stroke, a bumper 252 mounted on the index member 158 contacts a stop pin 254 secured to the frame. This stops the index return stroke of the member 158 and the shaft 156.

However, the projection 204 on the disc 120 has not returned to the starting point of the circle of rotation which would initiate a new cycle. Therefore projection 204 continues to move toward the stop pin 254. Since the collar 226 and the shaft 220 cannot move further because of the now fixed position of end 206, the force exerted by spring 238 is overcome by the forces exerted against the spring seats 234, 236. The spring 238 is further compressed and the housing pieces 208, 210 move on the shaft 220 toward the stop pin 256 until the initial starting point of the cycle on the circle of rotation is reached. This position is shown in the cross-section of assembly 200 in FIG. 6 where the annular aligning and spacing member 214, which marks the midpoint of chamber 228, is displaced to the right of collar 226 and is serving as a stop member for spring seat 242.

After the projection 204 passes the initial starting point of the cycle, the projection 204 starts to move away from the stop pin 254 and the housing 208, 210 is biased to the left by the force of the compressed spring 238 on the bearing 222 to permit the housing 208, 210 to eventually resume its centrally located position with respect to the collar 226.

When the collar 226 again reaches the midpoint in chamber 228, preloaded spring 240 again contacts the other side of the collar 226 through the spring seat 242. Both springs are preloaded with the same amount of spring force between their respective seats and thus maintain the collar 226 at the midpoint in the chamber 228.

The amount of preloaded spring force exceeds the force exerted by the movement of projection 204 in pulling or pushing the shaft 156 and the indexing member 158 in the reciprocal indexing stroke. Therefore, the tie rod assembly 200 maintains the same overall dimensional length in both the index forward and the index back strokes of the clamp rails, and only changes dimensionally to accommodate the stops at the end of the index strokes, thus creating a dwell period between each index stroke.

The dwell period is similarly created at the end of the index forward stroke. A bumper mounted on an indexing member which is separated from and located to the rear of the central indexing member 158 contacts the stop pin 256 secured to the frame before the rear indexing member reaches the natural end of a forward stroke. (Best seen in FIG. 7).

The tie rod assembly 200 reacts in a similar but opposite fashion to that just described for the index back stroke to create a dwell period at the end of the index forward stroke. Although the indexing member 158 cannot move any further forward because it is mechanically linked to the rear indexing member by an indexing rail means 178, the projection 204 continues to move away from the stop pin 256 until the return portion of the cyclic circle of rotation is reached. This causes the housing 208, 210 to move to the left to further compress the spring 240 between the collar 226 and the spring seat washer 244. When a return portion of the cyclic circle of rotation is reached the projection 204 again starts moving closer to the stop pin 256 and the spring 240 eventually biases collar 226 back to its midpoint location in the chamber 228 so that an index return stroke can begin.

In summary, approximately 110° of rotation of the control disc 120 is utilized for the index forward stroke of the transfer mechanism in taking each bottle to the next station. Approximately 160° of rotation of control disc 120 is utilized in returning the transfer mechanism to its starting point. A total of approximately 90° of rotation of the disc 120 is divided between and used for the two dwell periods at the ends of the index forward and index return strokes. The dwell periods enable the closing of the bottle clamps before the index forward stroke and the opening of the bottle clamps before the index return stroke. The use of a telescoping tie rod assembly which extends and retracts in response to the application of a force larger than that exerted by the preloaded springs contained therein, by contact with stop pins, permits the establishment of dwell periods at the end of each stroke in the indexing sequence for the purposes discussed.

LOADING STATION

Figure 10:
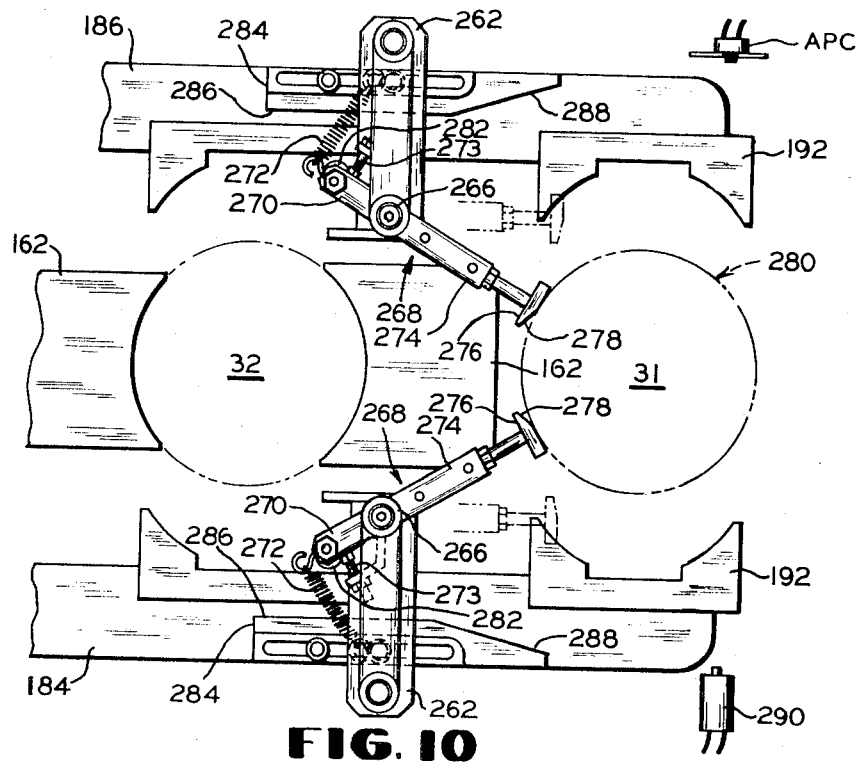
FIG. 10 is a plan view illustrating escapement apparatus located between the loading and orientation stations.
Figure 11:
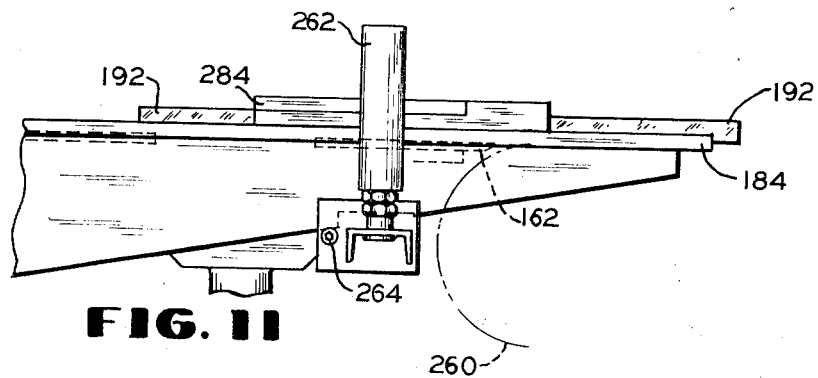
FIG. 11 is a side elevational view of the apparatus illustrated in FIG. 10.
Figure 12:
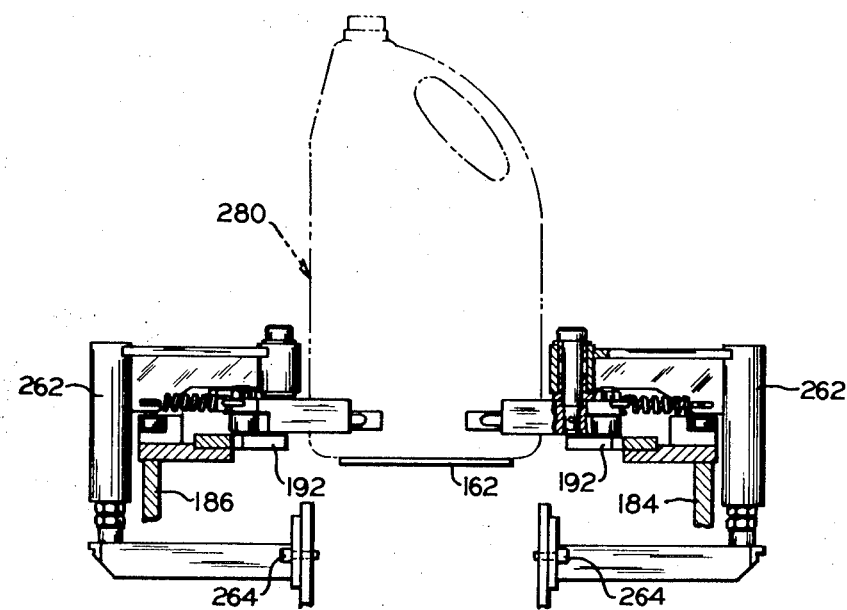
FIG. 12 is an end elevational view partially in section, of the apparatus illustrated in FIG. 11, looking upstream toward the loading station.
Figure 13:
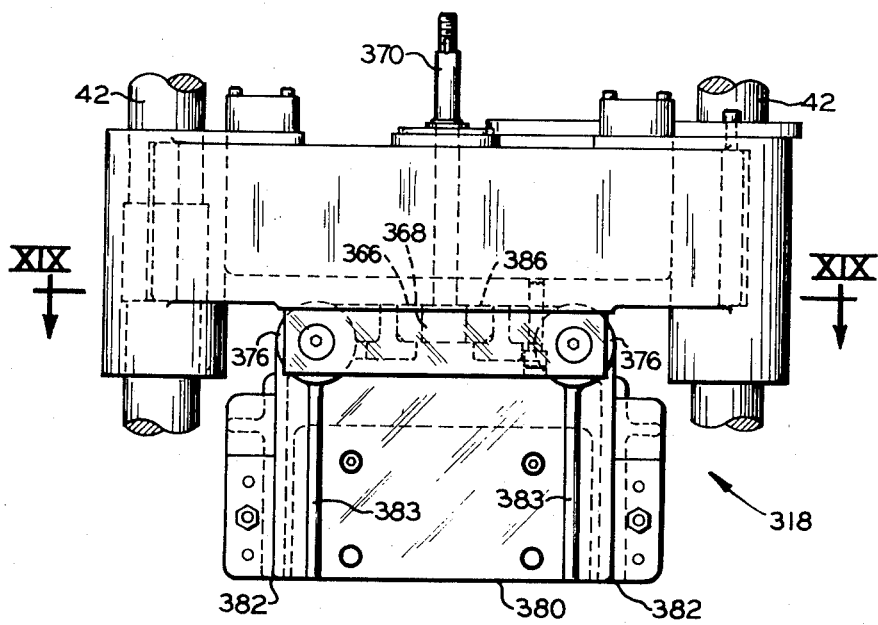
FIG. 13 is a side elevational view of the deflasher assembly taken from the same side of the apparatus as illustrated in FIG. 1.

Referring now to FIGS. 10, 11 and 12 apparatus is illustrated for loading the bottles into the indexing sequence. An endless loading conveyor 260 is shown to the rear of the transfer mechanism and terminates its run just short of the fixed conveyor bed 162. U-shaped support members 262 are secured on each side of the fixed conveyor bed 162 to the frame by bolts 264 or the like. Pivotally suspended above the clamp rails 184, 186 on pivot means 266 in the U-shaped support members 262 are bottle blocking arms 268.

Forwardly extending portions 270 of the arms 268 are biased outwardly away from the centerline of travel of the bottles by springs 272 connected between the arm portions 270 and the support members 262. Rearwardly extending portions 274 of the arms 268 on the other side of pivot means 266 are therefore biased inwardly toward the center line of travel of the bottles. Stop pins 273 prevent further outward movement of the portions 270 and further inward movement of the portions 274 of the arms 268.

Each of the rear arm portions 274 carries a head 276 on the end thereof. Each head 276 has an arcuately shaped configuration 278 formed thereon to permit rotation of the arms 268 away from the centerline of travel without disturbing the position of a bottle and moving it from a clamp engaging position. A bottle 280 is shown in position for loading after being brought by the conveyor 260 against the blocking heads 276.

Pivotally suspended below and at the end of each of the arm portions 270 are cam rollers 282. Mounted on clamp rails 184, 186 and in registration with the rollers 282 are edge cams 284 having first cam surfaces 286 extending parallel with the center line of travel of the bottles and second cam surfaces 288 inclined away from the centerline.

In the loading operation an opposing pair of bottle clamps 192 are moved toward each other and the opposite sides of bottle 280 by the inward movement of rails 184, 186 during the index dwell period described hereinbefore. When the cam surfaces 286 engage the cam rollers 282, the yielding bias of the springs 272 is overcome and the arm portions 270 swing toward, while the arm portions 274 swing away from, the center line of travel of bottles 280.

As can be seen from the drawings, the cams 284 must travel through approximately 60 percent of their total inward travel before the cam surfaces 286 engage the cam rollers 282. Therefore, the bottle clamps 192 are in position to slide in to grasp the bottle 280 as the heads 276 swing away from the centerline. The arcuate configurations 278 and the length of the heads 276 are calculated so that the bottle 280 is not moved forward by the conveyor 260 before the clamps 192 slide into bottle grasping position in synchronization with the swing of the heads 276 away from the centerline.

After the clamps 192 have grasped the bottle 280, the dwell period ends and an index forward stroke of the transfer mechanism starts as described hereinbefore. The cam surfaces 286 extend parallel with the line of travel or rails and clamps for a sufficient distance so that engagement with the cam rollers 282 is maintained by the cam surfaces 286 to keep the arms 268 apart to permit passage of bottle 280 therebetween from the loading station 31 to the orientation station 32.

After bottle 280 has sufficiently cleared the arms 268, the cam surfaces 288 receive cam rollers 282. Because the cam surfaces 288 are slanted away from the centerline of bottle travel, the springs 272 urge cam rollers 282 outwardly following the cam surfaces 288. This permits the arm portions 274 and heads 276 to swing in behind the bottle 280 being indexed to the orientation station 32. This prevents succeeding bottles from proceeding past the loading station 31 because the heads 276 establish contact with the leading bottle and prevents it from moving past a loading station position. The apparatus just described therefore constitutes an escapement mechanism that permits the passage of only the first of a series of objects during an index forward stroke, while permitting the next object in the series of objects to move forward for selection on a succeeding loading operation.

A lamp unit 290 may be mounted on the frame on one side of the line of travel of the containers at the loading station and energized to direct a beam across the loading station to a photocell pickup and signal unit APC. As long as a supply or an accumulation of containers is available at the loading station their presence is detected. When the photocell control unit APC detects the absence of a container or a supply of containers, a signal is generated which may be utilized to halt the operation of the machine until more bottles arrive.

DEFLASHER ASSEMBLY

Referring now to FIGS. 13 through 17, there is illustrated a deflasher assembly designated generally at 318. Initially looking at FIGS. 14 and 15, it is seen that the vertical shaft 320 (connected as described hereinbefore at its upper end to the one revolution clutch assembly 60) is connected at its lower end through adjustable connection sleeve 322 to drive a shaft 324. The sleeve connection permits adjustment of the deflashing assembly up and down for different size containers.

Drive shaft 324 is journally supported in a deflasher sub-frame portion 326 supported between two left frame posts 42 and two right frame posts 44 and extends therethrough to expose a shaft portion below. A horizontal arm 328 is key mounted on the exposed bottom end of shaft 324 and has a cam roller 330 pivotally suspended from the outer end thereof. The cam roller 330 is received in a linear cam slot 332 formed in the upper side of a channel-shaped rear cross member 338 of a trim knife block carrier 334. The slot 332 extends parallel to the line of travel of the containers.

The trim knife carrier 334 has a vertically disposed inverted U-shaped platen member 336 (best seen in FIG. 16) and a channel-shaped rear cross member 338. The platen member 336 and rear member 338 are connected by spaced side members 340.

Figure 17:
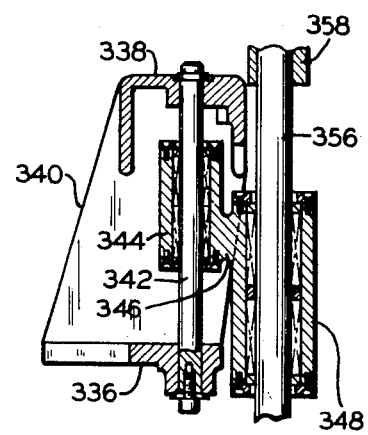
FIG. 17 is a cross-sectional view of the deflasher assembly illustrated in FIG. 14, taken along lines XVII—XVII of FIG. 14.

A pair of spaced shafts 342 (one of which is best seen in FIG. 17) extend horizontally and transversely to the line of travel of the containers and are connected between the platen member 336 and the rear member 338 of the trim knife carrier 334. The pair of shafts 342 are slidably mounted in a similarly spaced pair of bushing members 344. The bushing members 344 are each connected to a strut 346 depending through the open top of the trim knife carrier 334 from a similarly spaced pair of bushings 348 which are part of a second, two-part carriage assembly 350.

Figure 16:
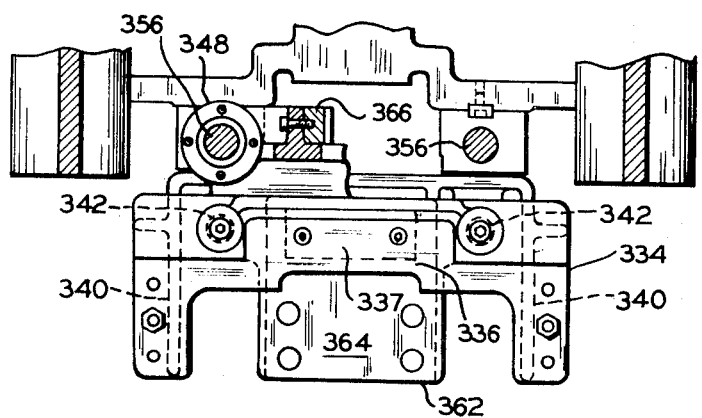
FIG. 16 is a cross-sectional view of the deflasher assembly illustrated in FIG. 14, taken along lines XVI—XVI of FIG. 14.

The vertical platen member 336 of knife carrier assembly 334 carries an upper knife member (not shown) at appoximately the midpoint of its face 337 shown in FIG. 16 to shear the moil from above the neck of the bottle or container.

The second carriage assembly is designated generally at 350 and comprises a right nest platen carrier designated generally at 352 and a left nest platen carrier designated generally at 354 as viewed looking downstream with the container flow. A spaced pair of transversely extending shafts 356 (best seen in FIG. 14) are connected between portions of subframe 326 designated at 358 above the fixed conveyor bed 162.

Figure 14:
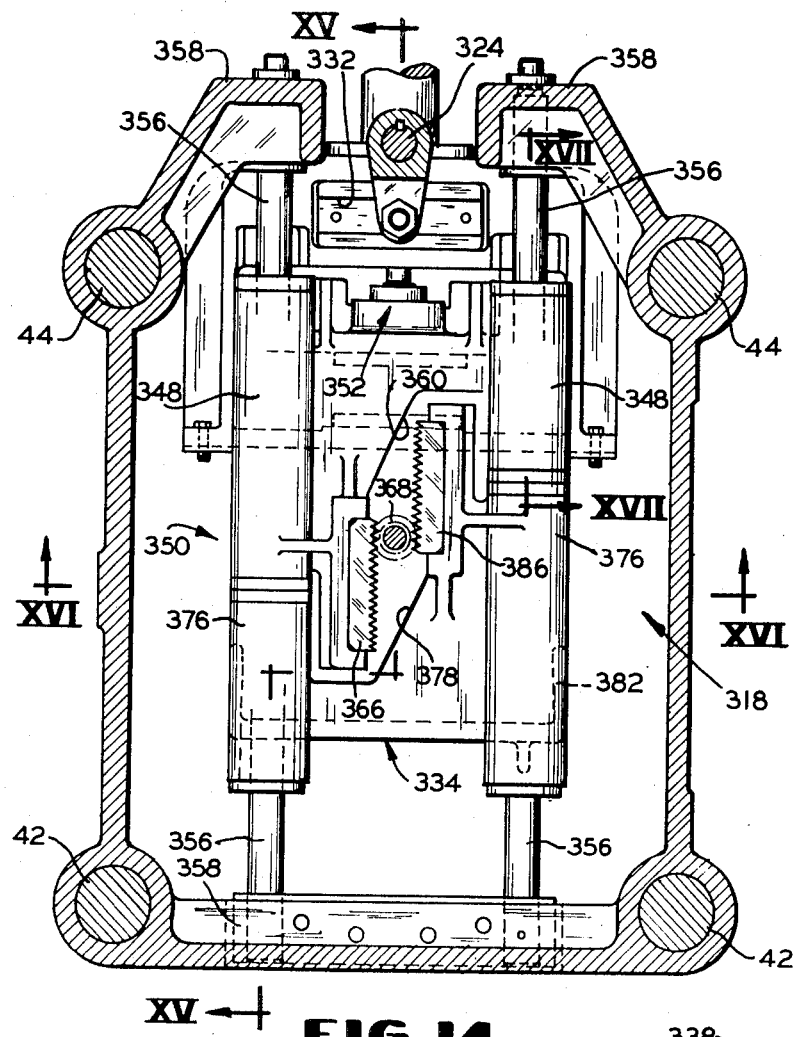
FIG. 14 is a cross-sectional view of the deflasher assembly illustrated in FIG. 13, taken along lines XIX—XIX of FIG. 13.

The right nest platen carrier 352 comprises an upper web member 360 connected to and extending between the spaced bushing members 348 (best seen in FIG. 14). The bushing members 348 are slidably mounted on the spaced transversely extending shafts 356. A nest platen member 362 extends downwardly from the rear of web 360 through the open top of the trim knife carrier 334 between the shafts 342 of the carrier 334 (best seen in FIG. 15). The face 364 of the platen member 362 carries a right nest block means (not shown) which will extend through and underneath the inverted U-shaped platen member 336 of the trim knife carrier 334 to meet and register with left nest and block means carried by a similar vertical platen member 380 of the left nest platen carrier 354.

Figure 15:
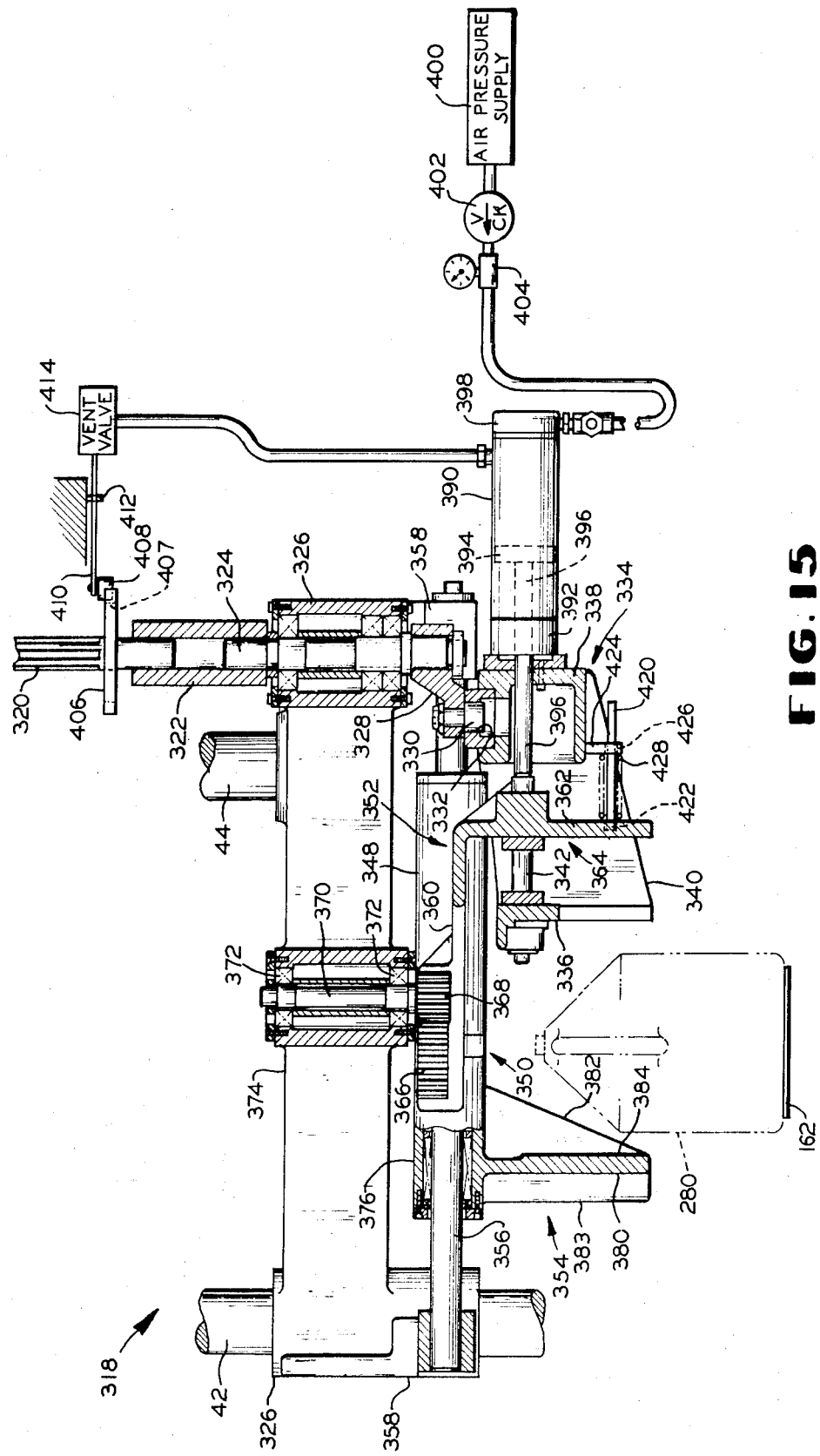
FIG. 15 is a cross-sectional view of the deflasher assembly illustrated in FIG. 14, taken along lines XV—XV of FIG. 14.

The web 360 of the right nest platen carrier 352 has mounted on the upper surface thereof a straight, toothed rack 366, the teeth of which are meshed with a pinion gear 368 mounted on a shaft 370 (both are best seen in FIGS. 14 and 15). The shaft 370 is journalled in bearing means 372 supported in frame portion 374 of the subframe 326 at a position between vertical posts 42, 44 and above the two-part carriage assembly 350. The shaft 370 thus constitutes a fixed pivot for the pinion gear 368.

The left nest platen carrier 354 comprises a spaced pair of bushings 376 slidably mounted on the spaced transverse shafts 356. A web 378 extends between and connects spaced bushings 376. A left platen member 380 extends downwardly from the rear of web 378 between side brace struts 382. The struts 382 depend from and are connected to the spaced bushings 376.

The face 384 of left nest platen 380, on the opposite side of the reinforcing ribs 383 on the rear of the platen 380, carries left nest die block means which will extend toward and register with the right nest block means carried on right platen face 364, to nest the container therebetween when the left and right nest platen carriers 352 and 354 are brought together.

For the purpose of clarity in illustrating the deflashing apparatus in FIGS. 13 through 17 of the drawings the left nest die block means and the right nest block means have been omitted. Since the left and right nest block means will be changed to mate with the configuration of the particular container having the flash and moil removed therefrom, the configuration of the left and right nest block means and the upper knife means is not a part of this invention. However, reference is made to U.S. Pat. No. 3,377,899, issued Apr. 16, 1968, for a pictorial illustration of left and right block means mounted on opposing platens to illustrate the function desired.

The web 378 of left carrier 354 has mounted on the top thereof a straight, toothed rack 386 (best seen in FIG. 14), the teeth of which are meshed with the pinion 368 on the side opposite from the rack 366 of the right carrier 352. It can be seen that when the right carrier 352 moves toward or away from the pinion gear 368, the rack 366 will rotate pinion 368 causing rack 386 to move the left carrier 354 toward and away from, respectively, the right carrier 352.

An air cylinder 390 has one end 392 secured to the channel-shaped rear member 338 of the trim knife carrier 334. A piston 394 is slidably received in the cylinder 390 and has a rod 396 extending therefrom out through cylinder end 392 and through a bore in the rear member 338 to be connected to the rear of platen member 362 of the right nest carrier 352. Air is supplied to a cylinder end 398 from an air supply means 400 via a check valve 402 and a pressure gauge 404.

The operation of the deflasher assembly just described is as follows. The vertical shaft 320 will be rotated one revolution in response to the actuation of the one revolution clutch unit 60 immediately after a bottle 280 has been indexed into the deflashing station 34. The single revolution of the shaft 320 rotates the shaft 324 one revolution, causing the cam roller 330 attached to arm 328 to describe a complete circle around the shaft 324. On the first half of the circle of revolution of the cam roller 330 pressure against the inner wall of the linear cam slot 332 will move the trim knife carrier 334 toward the bottle 280 to be deflashed.

The right platen member 362 of the right nest platen carrier 352 is pushed against and retained against the rear of the platen member 336 of the trim knife carrier 334 for a first part of the inward travel of the carrier 334, in response to air pressure in the cylinder 390 pushing against the piston 394. A force is exerted through the rod 396 against the rear of the platen member 362 of the right nest carrier 352. Thus, as the trim knife carrier 334 moves forward in response to the beginning of the single revolution of the shaft 324 the platen member 362 will ride behind and against the rear of the platen member 336.

As noted hereinbefore, the right nest block means attached to the face 364 of the right nest platen member 362 extends underneath and through the U-shaped platen member 336 past the upper trim knife member carried by the trim knife platen 336. Therefore, the right nest block means carried by the right nest platen member 362 and the carrier 352 will reach the bottle 280 before the trim knife means carried by the trim knife platen member 336 reaches the container.

As the trim knife platen member 336 moves forward, the right nest platen member 362 is in abutting relationship with the rear thereof and the rack 366 on the right nest carrier 352 is operating through the pinion 368 and the rack 386 on the left nest carrier 354 to move the carrier 354 and the right nest platen member 380 toward the bottle 280 to have the flash and moil removed.

The left nest block means mounted on the face 384 of the left nest platen member 380 of the left carrier 354 and the right nest block means mounted on the face 364 of the right platen member 362 of the right carrier 352 are dimensioned so that the cooperative action of the racks 366, 386, and pinion 368 is operative to deliver the left nest block means on the face 384 and the right nest block means on face 364 to the bottle 280 at substantially the same time. The finished neck portion of a bottle 280 is grasped by means associated with the left and right block means and permits a nesting of the container 280 between the opposing nest faces of the left and right nest block means.

When the left nest block means and the right nest block means carried on platen faces 384 and 364 meet and support the container 280 therebetween, the inward travel in response to air pressure in cylinder 390 of platen members 362 and 380 stops. However, the meeting and mating of the left and right nest block means occurs before the cam roller 330 has completed the first half of its circle of revolution. Therefore, as the cam roller 330 continues and completes the first half of its circle of revolution, the trim knife platen 336 is driven inwardly to the furtherest point of travel which is determined by the length of the arm 328. After the left and right nest block means meet the trim knife platen 336 continues to travel. The trim knife means mounted on the inner face of platen member 336 then severs the flash and moil from the bottle 280 while the bottle is securely held in place by the left and right nest block means.

When the cam roller 330 reaches the half-way point in its circle of revolution, the position illustrated in FIGS. 13 through 17, the cam roller 330 will begin to bear on the outer wall of the slot 332 to start to pull the trim knife carrier 334 outwardly away from the bottle 280 and disengage the trim knife means.

The air pressure supplied via the check valve 402 to the cylinder 390 is sufficient to force the piston 394 and the rod 396 against the right nest platen member 362 to insure a mating and nesting engagement of the left and right nest block means at bottle 280. Once this engagement occurs the nest platens 362 and 384 remain in the nesting position and cannot travel further toward the center. However, as described hereinbefore the trim knife carrier 334 is continuing its travel inwardly and, since the air cylinder 390 is mounted on the trim knife carrier 334, the air cylinder 390 also continues its inward travel. This travel causes movement of the air cylinder 390 with respect to the now stationary piston 394. As a result, air pressure begins to build up in that portion of the air cylinder 390 between the piston 394 and the cylinder end 398.

Therefore, once the arm 328 and the roller 330 pass the half-way point of the cycle the increased air pressure between the piston 394 and the cylinder end 398 acts as a compressed spring which urges the cylinder 390 outwardly pulling the trim knife carriage 334 with it. The compressed spring action of the increased air pressure in the cylinder 390 tries to overdrive or override the set speed of the one revolution clutch unit 60 during the last half of the revolution of the shaft 324.

This problem may be avoided by venting the space in the cylinder 390 between the piston head 394 and the cylinder end 398 at or just after the half-way point in the cycle of rotation. This may be accomplished through a cam wheel 406 which may be mounted on the shaft 320, or be made otherwise responsive to the position of the arm 338 or the location of the cam roller 330 in its cyclic circle of rotation. The outer periphery of the edge cam wheel 406 is shaped so a step or indentation 407 will indicate that half of the cycle is completed and that the trim knife carrier 334 is withdrawing. A cam follower 410 is spring biased to follow the cam surface on the outer periphery of the wheel 406 and indicates through the cam follower 410 that the carrier 334 is withdrawing. The cam follower 410 may be an arm pivoted as at 412 or may be a reciprocating stroke cam follower shaft. The cam follower 410 transmits a signal to a three-way valve-vent unit 414 to open a valve to the atmosphere to vent the cylinder 390 and release the higher pressure that is working to hurry the outward movement of the cylinder 390 and thus the outward movement of the trim knife carrier 334.

While the above described venting mechanism solves the problem of the spring action of the cylinder 390 on the withdrawal stroke, another problem is created if the cylinder 390 is vented completely. That is, there is now no pressure in the cylinder 390 to work against piston 394 to maintain the nest platens 362 and 380 in their mating and engaged position while the trim knife means mounted on the trim knife platen 336 is withdrawing from contact with or is disengaging from the flash, moil, and/or bottle. This latter problem may be overcome by connecting vent valve 414 not to the atmosphere, but by returning the vent connection to the air pressure supply system through a relief valve so that a pressure of interfering magnitude will not be reached. Alternatively, a shaft 420 may be screw threaded or otherwise attached at 422 in the back of the right nest platen 362. A depending flange 424 may be attached to the bottom of the rear channel member 338 of the trim knife carrier 334 and have a bore 426 formed therein to slidably accommodate shaft 420. A spring 428 may be placed on the shaft 420 between the flange 424 and the platen 362. The spring 428 may be preloaded to apply a desired pressure against the platen 362 even though the vent valve 414 vents the cylinder 390 to the atmosphere and leaves little or no pressure within the cylinder 390. The srring 428 does not have to be heavily preloaded since a light pressure will accomplish the desired results and since the spring is compressed by the continuing inward travel of the carrier 334.

Returning now to the operation of withdrawing the three platens to their completely separated positions, the cam follower 330 passes the half-way point in its cycle of rotation and bears against the outside wall of the slot 332, thus pulling trim knife carrier 334 out of the cutting engagement position and back toward the start of its reciprocal stroke. After an initial portion of outward travel, the back side of the trim knife platen 336 again abuts the front side of the right nest platen 362. As the outward travel of the trim knife platen 336 continues, the right nest platen 364 is pushed away from nesting engagement with bottle 280. The action of the rack-pinion-rack assembly 366, 368 also withdraws the left nest platen 380 out of engagement with bottle 280. This withdrawal action continues until all three carriers and platens have been returned to their initial, separated starting positions. The vent valve 414 is now closed by the return of cam follower 408 to the high position of the cam surface on the cam 406. Air pressure supply 400 is now able to repressurize the cylinder 390 to the desired initial nest platen engaging pressure through the check valve 402. The deflasher assembly 318 is ready for the nest deflashing operation.

IDLE STATIONS

The flash on the bottles 280 has been used in the prior art to assist in orienting and in stabilizing the bottles as they are moved through a deflashing machine. In the present instance the flash and moil is removed as the first operation of a series of operations by a single machine and, since idle stations may be required to increase the distance between work stations while maintaining a short transfer distance, it is desirable to provide a stabilizing means to maintain a desired orientation of the bottles at all stations, including the idle stations.

Figure 18:
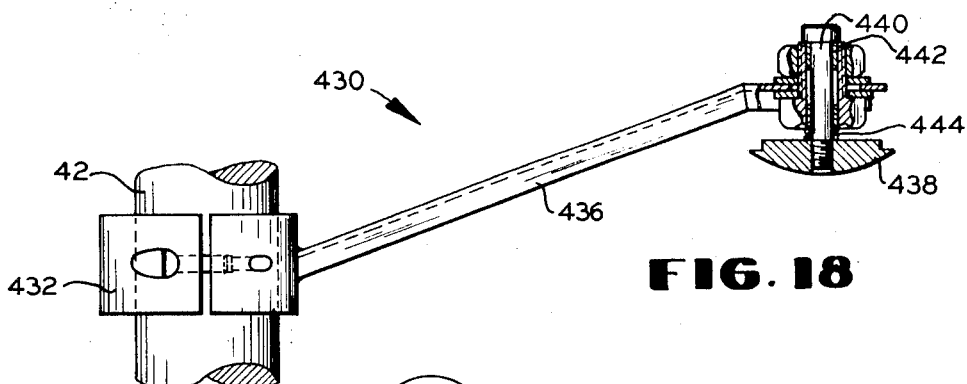
FIG. 18 is a side elevational view of a stabilizer assembly at an idle station.

Referring to FIG. 18 there is generally indicated at 430 apparatus to maintain the bottles stable and oriented when they are not being subjected to an operation at another station or being held between clamps 192. The stabilizer 430 comprises a clamp 432 which may be adjustably mounted on a post 42 of the frame which is convenient to that particular idle station. An arm 436 extends from the clamp 432 out over the center line of the travel of the bottles. A rest pad 438 having a convex configuration on the lower side is suspended and supported above the center line by the arm 436. The rest pad 438 is urged upwardly, as the bottle 280 is transferred into the idle station, by the neck portion of a bottle during the completion of the transfer movement. Since the pad 438 is convex, the central portion of the pad will dip into the neck opening and maintain the bottle stable and oriented.

A vertically reciprocable pin 440 is mounted for sliding movement in a bushing means 442 supported at the end of arm 436. The rest pad 438 and the reciprocating pin 440 assembly may be made heavy enough so that gravity will effect the stability desired. However, if additional holding against vibration is desirable the rest pad 438 may be biased downwardly by a light spring 444 mounted on the pin 440 between the top of the rest pad 438 and the bushing 442.

FACER CNA LEAK DETECTOR DRIVE ASSEMBLY

Figure 19:
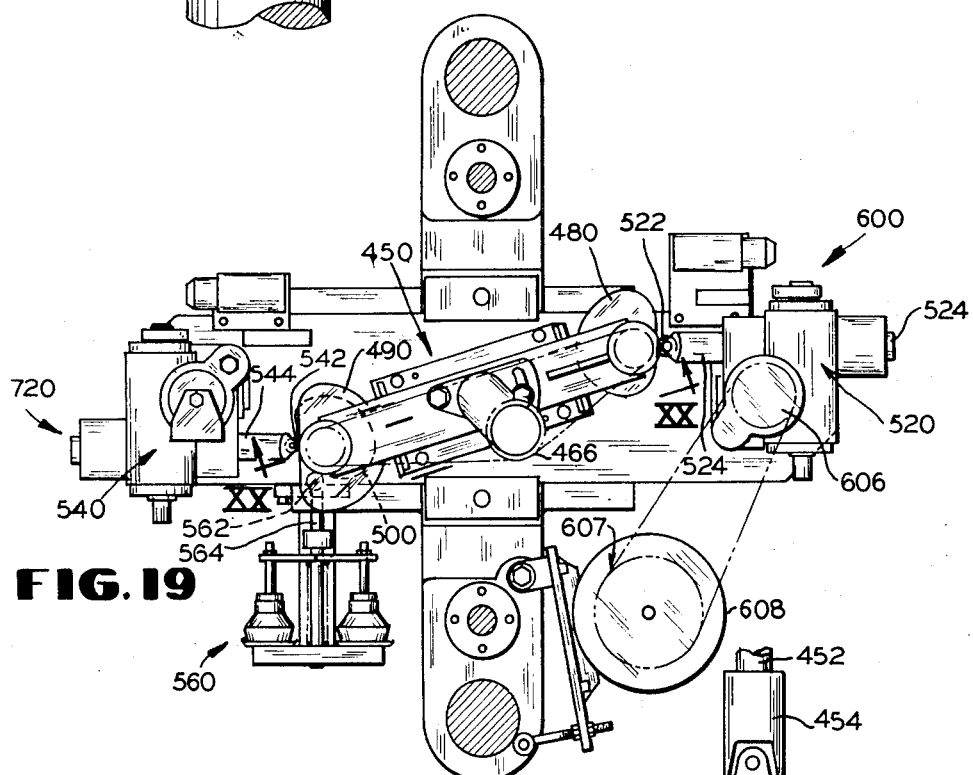
FIG. 19 is a plan view of the facer and leak detector drive carrier assembly.
Figure 20:
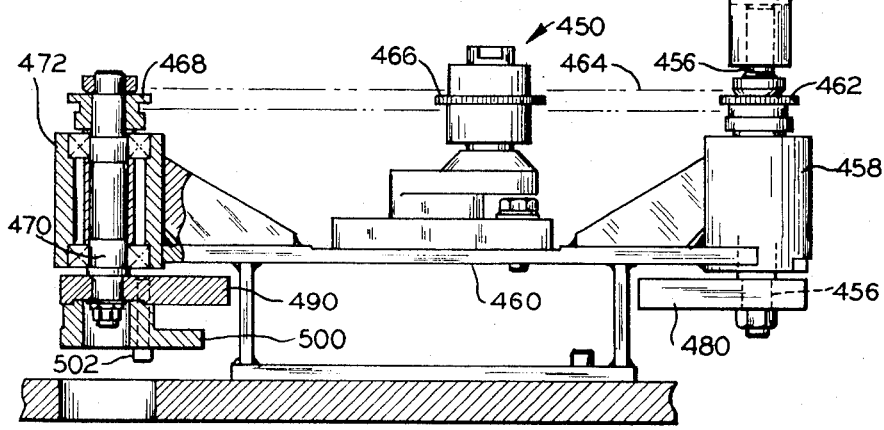
FIG. 20 is a cross-sectional view of a portion of the apparatus illustrated in FIG. 19, taken along lines XX—XX of FIG. 19.
Figure 25:
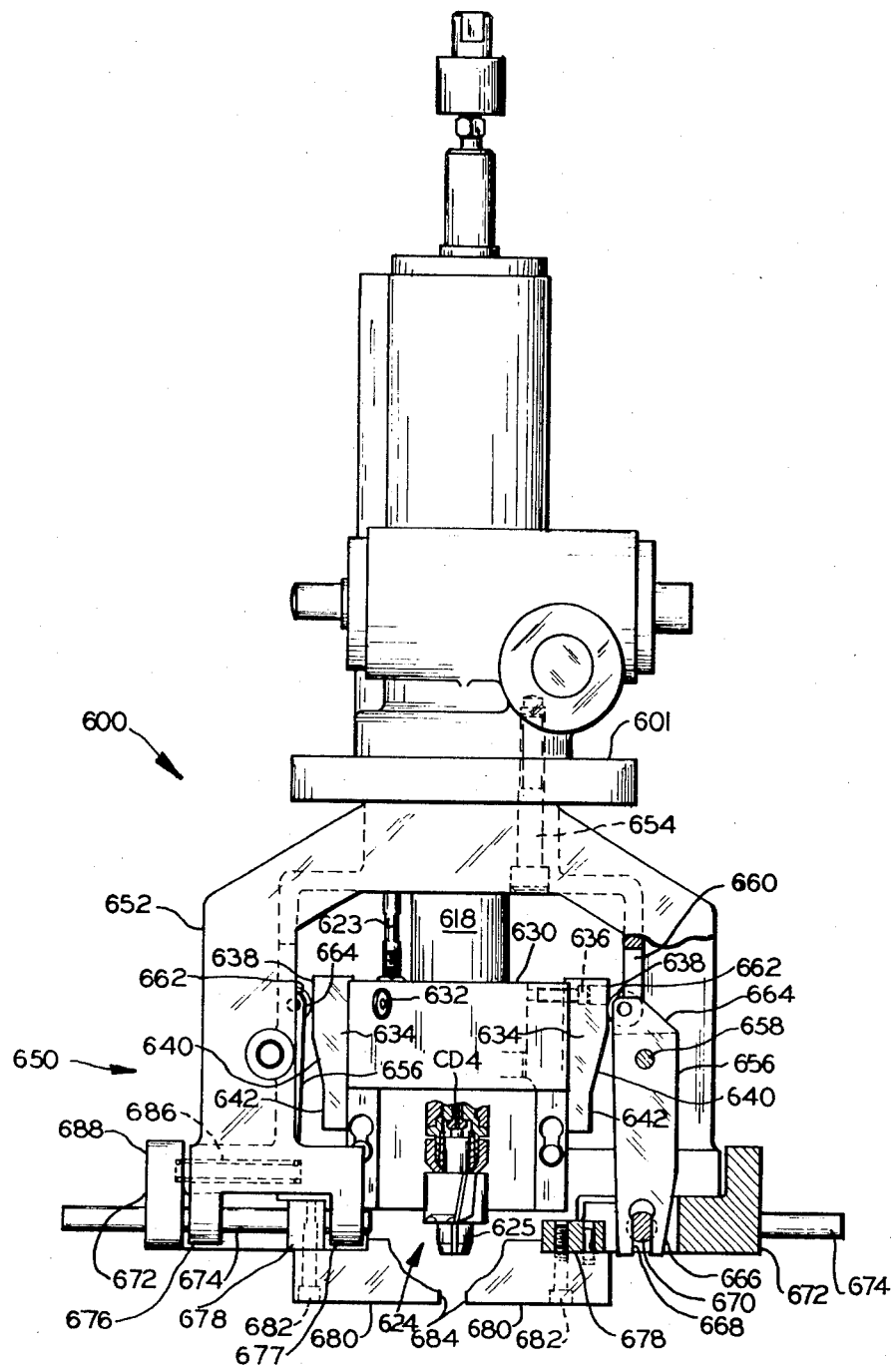
FIG. 25 is an end elevational view of the facer assembly looking downstream of the container flow therethrough.
Figure 27:
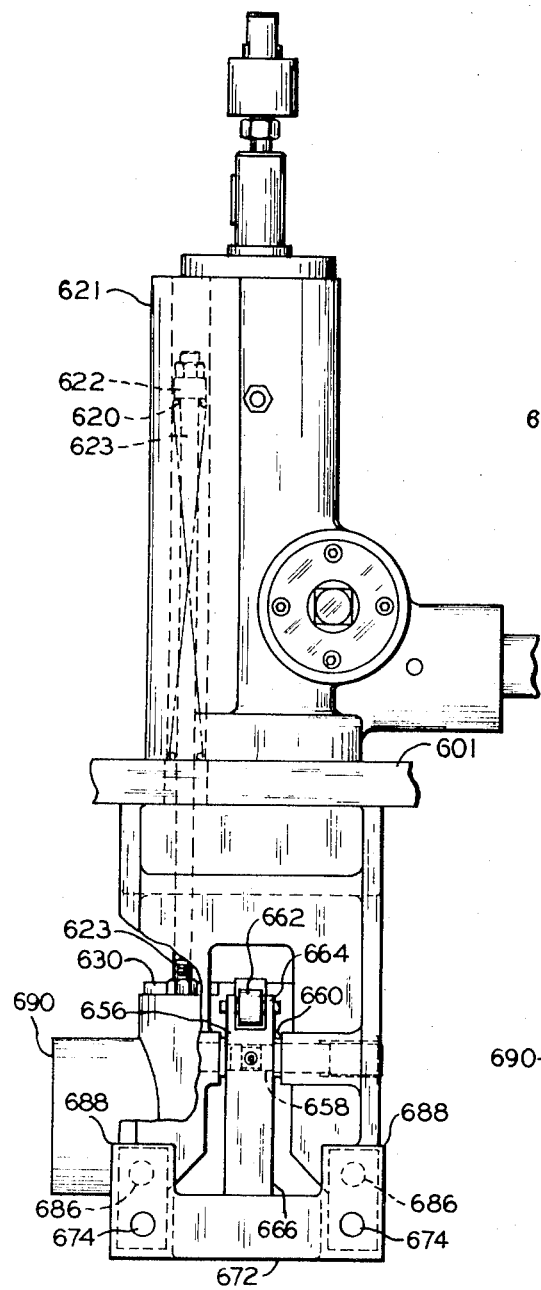
FIG. 27 is a side elevational view of the facer assembly taken from the left side of the machine.
Figure 28:
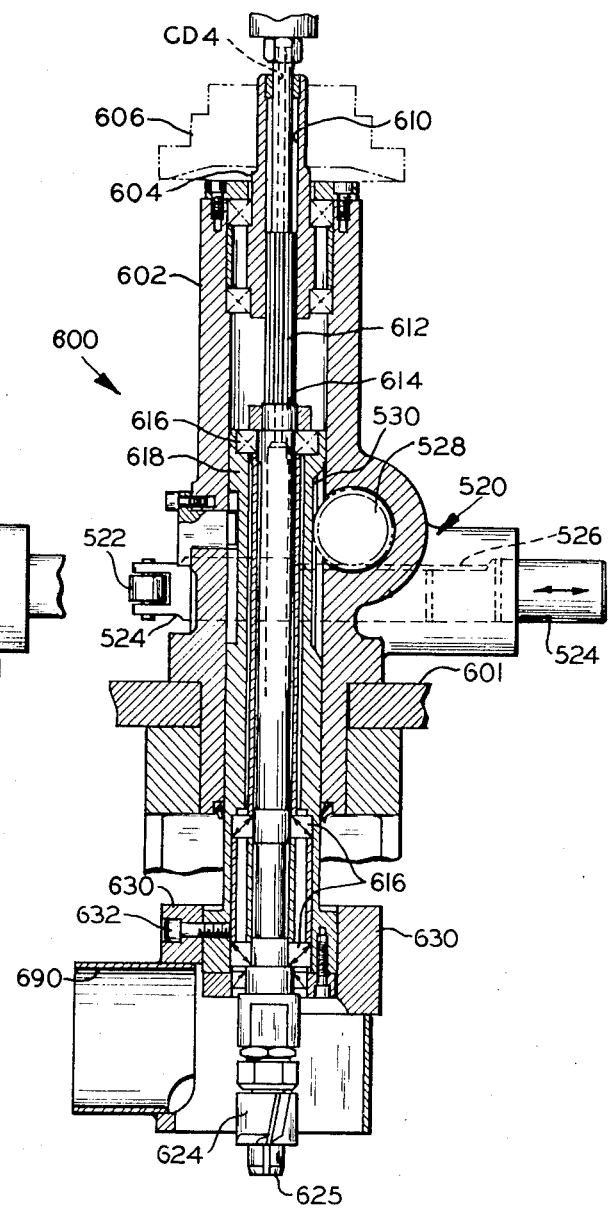
FIG. 28 is a cross-sectional view of the facer assembly in FIG. 24, taken along lines XXVIII—XXVIII of FIG. 24.

The drive carrier assembly for the facer and leak detector stations is indicated generally 450 in FIGS. 19 and 20. The drive shaft 452 is responsive to the one revolution clutch unit as described hereinbefore and is connected through a universal joint 454 to a facer cam shaft 456 for controlling the vertical reciprocation of the spindle of the facer assembly. The facer cam shaft 456 is journally supported in a bearing support 458 secured to a frame portion 460.

A pulley 462 on the facer cam shaft 456 transmits, via a belt 464 and an idler pulley 466, rotational drive to a pulley 468 mounted on a leak detector drive shaft 470. The leak detector drive shaft 470 is journally supported in a bearing means 472 supported on the frame portion 460.

A facing spindle feed edge cam 480 is carried on that portion of the shaft 456 which extends below the bushing means 458. A leak detector stroke cam 490 is carried on that portion of the leak detector drive shaft 470 that extends below the bearing means 472. A leak detector pressure supplying and leak timer cam 500 is carried below the cam 490 on the shaft 470 and secured to cam 490 by a series of bolts 502. The direct connection between the cams 490 and 500 via the bolts 502 insures synchronization of the respective actions of the two cams.

As best seen in the plan view in FIG. 19 the cam 480 is positioned to drive a facer rack-pinion-rack spindle feed assembly designated generally at 520. A cam roller 522 of the assembly 520 maintains contact with the periphery of the cam 480 and translates the rotary motion of the cam 480 to linear motion in the assembly 520 through a reciprocating cam follower shaft 524.

Also in FIG. 18, the edge cam 490 is illustrated as driving the leak detector rack-pinion-rack stroke feed assembly designated generally at 540. A cam roller 542 maintains contact with the cam surface on the periphery of the cam 490 and translates the rotary motion of the cam 490 to linear motion via a cam follower shaft 544 connected to the cam roller 542. Similarly, the leak detector pressure supplying and leak timer cam 500 translates its rotary motion into linear motion via a cam roller 562 maintained in contact with the cam surface periphery of the cam 500. The cam roller 562 is connected to a cam follower shaft 564 which utilizes the linear motion received to effect operation of the leak detector pressure supplying and leak timing assembly generally designated at 560.

FACER ASSEMBLY

The facer assembly is best seen in FIGS. 24 through 28 and is designated generally at 600. The facer assembly 600 is supported from the frame at a position upstream of the container flow from the face and leak detector drive carrier assembly 450 which has been described hereinbefore, the frame portion being designated at 601 in FIGS. 25, 27 and 28.

The facer assembly 600 includes a main vertical outer housing 602 having a drive shaft 604 journally supported at the upper end thereof. A pulley means 606 mounted on the drive shaft 604 is driven by a belt and pulley means 607 connected to a facer spindle drive motor 608 (best seen in FIG. 19).

The drive shaft 604 is hollow and has grooved ways 610 formed therein for receiving splines 612 formed on a spindle shaft assembly 614. The spindle shaft assembly 614 is journally supported in bearing means 616 mounted in an internal housing or quill 618 which is vertically reciprocable inside the outer housing 602. The internal housing 618 is biased upwardly by spring means 620 located in a vertically disposed spring housing 621 adjacent to and part of main housing 602 (best seen in FIG. 27). Spring means 620 applies force against a collar 622 of a rod 623 attached to a platen cam carrier 630.

Tooling indicated generally at 624 is attached to the bottom of the spindle shaft assembly 614. The tooling 624 may be for facing, chamfering, reaming or other machining operations at this station which are desired. However, the tooling shown is a facing tool and for the purposes of describing this invention the operation at this station will be referred to as a facing operation, even though it is understood that other operations may be performed. In this instance the tooling 624 includes a downwardly extending projection 625 which is chamfered at its lower edge so that the projection 625 is guided into the neck of the container and assists in positively locating the facing tool with respect to the container receiving the operation.

The facer rack-pinion-rack spindle fed assembly designated generally at 520 includes a cam roller 522 and a horizontal cam follower shaft 524 slidably mounted in a projection on the side of housing 602. The shaft 524 has a horizontal straight, toothed rack 526 formed along the top thereof with the teeth meshed with a horizontal elongated pinion gear 528 journally mounted in spaced bushing means 530. A vertical straight, toothed rack 532 is formed on the side of the vertically reciprocable internal spindle housing 618. The upward biasing of the quill or internal housing 618 by the spring means 620 urges the cam shaft 524 and the cam roller 522 against the periphery of the edge cam 480, causing the position of the internal housing or quill 618 to be constantly responsive to the position of rotation of the cam 480.

A platen cam carrier 630 (best seen in FIG. 25) is secured to the lower end of the internal housing 618 by bolt means 632. A pair of platen cams 634 are mounted on opposite sides of the platen cam carrier 630 by bolt means 636.

Each platen cam 634 has an upper vertical cam surface 638, an intermediate cam surface 640 which continues downwardly from cam surface 638 and is indexed toward the spindle axis, and a lower vertical cam surface 642 extending downwardly from the cam surface 638.

A container neck gripping mechanism is designated generally at 650 and includes a downwardly opening yoke means 652 secured to frame portion 601 by bolt means 654. The bolt means 654 extend through the frame portion 601 to also secure external spindle housing 602 to frame portion 601 and aligns housing 602 with the downwardly opening yoke means 652. The internal housing or quill 618 extends through an opening formed in both the frame portion 601 and in the frame adjacent portion of the yoke means 652 for connection with the cam platen carrier 630.

The yoke means 652 carries an opposed pair of cam following arms 656 pivotally mounted on pivot pins 658 extending across slots 660, formed in the downwardly extending legs of yoke means 652 and receiving cam follower arms 656 therein for pivotal movement. A cam follower roller 662 is rotatably carried in each of the upper ends 664 of the arms 656. The lower ends 666 of arms 656 have slots 668 formed therein to receive horizontally disposed platen driving rods 670 which are pivotally mounted in tooling platen carriers designated generally at 672.

Each of the platen carriers 672 is slidably mounted on a horizontal pair of spaced shafts 674, each pair of shafts 674 being supported in spaced flanges 676, 677, depending from each of the downwardly extending legs of the yoke means 652. Tooling carrying platen faces 678 are formed on the forward lower surface of each carrier 672. Opposing neck grasping tooling clamps 680 are connected to platen faces 678 by bolt means 682. The opposing surfaces 684 of tooling clamps 680 are provided with configurations which will mate with the outer surface of the finish neck portion of the bottle 280.

Shaft supported spring means 686 are positioned between each yoke leg and upwardly extending flange means 688 on each carrier 672 to yieldingly bias or urge carrier 672 away from the neck clamping position, thereby holding cam rollers 662 in engagement with their respective cam surfaces.

A blower may be attached to the blower inlet 690 to blow away the chips or other debris resulting from the machining operation being performed at this station. An air conduit CD4 may be formed through the drive shaft 604, the spindle shaft assembly 614, and the tooling 624 to deliver air under pressure into a bottle through the projection 625 to cause air flow out of the neck of the bottle to prevent chips or debirs from the machining operation from entering the bottle.

In the operation of the facer assembly, the spindle shaft assembly 614 is driven constantly through the belt and pulley arrangement 607, 606 from the motor 608 so that the cutting tool 624 is rotating constantly.

The reciprocal stroke cycle of the assembly is mechanically controlled by the rotary cam 480 which is responsive to the one revolution clutch assembly. Referring to FIG. 21 there is shown an enlarged view of the cam 480 with a graphic representation of its cycle shown at 482. The results of rotation of cam 480 on the cam roller 522 of the rack-pinion-rack spindle feed means is also shown.

As noted by the graphic representation 482, the edge of the cam 480 is shaped with respect to the center of the shaft 456 on which it is mounted so that the first 112° of rotation of the cam 480 provides for a very rapid travel of the cam roller 522 away from the center of the shaft 456, and thus a corresponding rapid travel of the feed mechanism 520 and a rapid lowering of the tool 624 toward the neck of the container. The next 136° of rotation of the shaft 456 pushes the cam roller 522 away from the center of the shaft 456 only a short distance, this short distance at the end of the vertical stroke comprising the cutting time or cutting stroke of the facer mechanism. The cam surface is further so shaped so that at the end of the cutting stroke the cam roller 522 stays in the same position or dwells for 4° to permit a finishing of the cut surface. the remaining 108° of rotation of the cam 480 permits a rapid return of the cam roller 522 and thus the cutting tool 624 to its original position to be ready for the next cycle.

It will be noted that a series of spaced notches 484 are formed in the edge area of the cam surface which is engaging the cam roller 522 during the cutting stroke. These notches or detents permit a slight return of the cam roller 522 toward the shaft 456 as the detent is passed over. This, in turn, causes the facer tool 624 to lift slightly periodically during its cutting stroke. The periodic lifting of the facing tool 624 stops the cutting momentarily, thus breaking the continuous lengths of material being cut from the top of the container into short chips. This enables the cuttings to be blown away more easily by the blower means connected to the blower entry 690 and avoids the longer chips or cuttings which might become entangled in the mechanism and interfere with the operation thereof.

In the operation just described, when the internal housing or quill 618 is lowered it also lowers the cam platen carrier 630 attached thereto. When the cycle or stroke starts the platen cam rollers 662 are engaging the surfaces 642 on the lower part of the platen cams 634. As the platen cams 630 proceed downwardly the cam rollers 662 engage the cam surfaces 640 which incline upwardly and outwardly away from the cam surfaces 662. This pushes the cam rollers 662 away from the axis of the cutting tool 624 and, through the pivoting action of the arms 656, moves the tooling platen carriers 672 toward the centerline of the bottle flow through the mechanism. Thus the opposing gripping clamps 680 are advanced toward each other and around the finish neck portion of the container 280. This advance continues until the neck finish portion is firmly supported by the clamps 680 which occurs as the upper cam surfaces 638 are reached. The neck gripping operation is mechanically synchronized with the lowering of the tool 624 so that the chamfered surfaces of the projection 625 of the tool may assist in centering the neck of the container if it is slightly out of position. The upper cam surfaces 638 permit continued movement downward of the tool 624 and provide a dwell in the clamp position as the quill feeds the cutting spindle into the machining operation. The dwell position of cam surfaces 638 also insures that the neck portion remains clamped until the quill has completed a portion of its withdrawal and return stroke to prevent dislocation of the bottle from its desired orientation on the conveyor bed 162. The opening of the clamping tools 680 is completed during the remainder of the return stroke of the quill.

LEAK DETECTOR STATION

Figure 31:
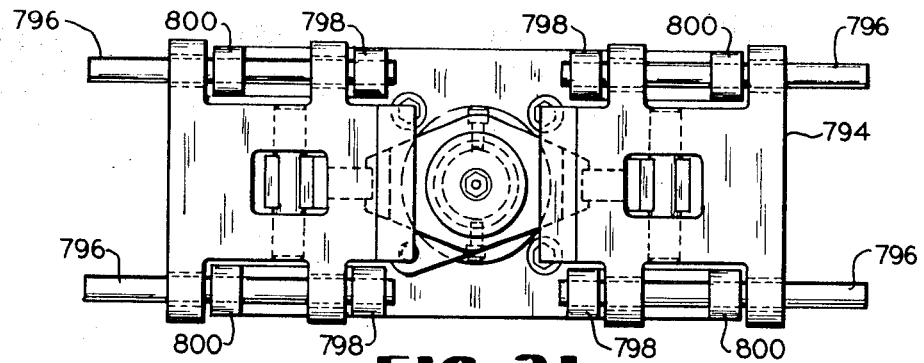
FIG. 31 is a bottom view of the assembly illustrated in FIG. 30.

Referring to FIGS. 29, 30, and 31, a leak detector assembly is generally designated at 720 mounted on a frame portion 722 which extends downstream from the frame portion 460 supporting the facer and leak detector carrier assembly 450.

The leak detector assembly 720 includes a main vertical outer housing 724 and an internal cylindrical housing 726 slidably mounted for vertical reciprocation in the main housing 724.

A leak detector rack-pinion-rack stroke feed assembly 540 controls the positioning of the internal housing 726 in the main housing 724.

The assembly 540 includes a cam roller 542 rotatably supported at the end of a cam follower shaft 544 which is slidably mounted in the housing of the assembly 540. A horizontal straight, toothed rack 546 is formed on the top of the shaft 544 with the teeth thereof meshed with a horizontal elongated pinion gear 548 formed on a shaft 549 which is journalled in spaced bushings 550 in the housing of the assembly 540. A vertical straight, toothed rack 552 is formed on the side of the internal cylindrical housing 726 with the teeth thereof meshed with the pinion gear 548. A cam means 554 is mounted on one end of the shaft 549 and via a cam roller-arm assembly 556 indicates to a limit switch LS4 mounted on the frame 722 if the internal housing 726 is at the top or substantially at the top of its travel.

A spring means on a rod 730 connected to a platen cam carrier 750 which is mounted on the lower end of the internal housing 726, biases the internal housing 726 upwardly and maintains the cam roller 542 in contact with the edge cam 490 in the same manner as the biasing spring means 620 operated to bias the internal housing 618 upwardly in the facer assembly 600.

A hollow air shaft 732 which is an extension of a conduit CD6 is slidably mounted in bearing means 734 supported inside the hollow cylindrical housing 726. An upper collar 728 supports the upper end of the air shaft 732 on the top end of the housing 726. A compression spring 738 on the bottom of the air shaft 732 is compressed between a lower collar 740 fixed on the lower end of the air shaft 732 and the upper end of a counter bore 742 formed inside the lower end of the cylindrical internal housing 726, to yieldingly bias the air shaft 732 downwardly against the restraint of the upper collar 728.

The air shaft 732 terminates at its lower end with a downwardly extending nozzle 744 for extension into the neck of a bottle to be tested. An annular cap or closure means 746 having a resilient seat 748 on the lower face thereof extends radially from the lower end of the air shaft 732. The cap 746 and the seat 748 will bear againt and seat on the top of a finished neck portion of a bottle to hold the air supplied from the air shaft 732 inside the container during the test.

A three-way valve assembly TWV is supported on top of the air shaft 732 by conduit portion CD6. A junction JCT2 of the pneumatic circuit receives pressurized air via conduit CD5 and supplies the pressurized air to the three-way valve TWV, to a conduit CD7 which is connected to a pressure test sensor PTS (Not shown), and to the air shaft 732. A bracket BRK mounted on the top of the internal housing 726 supports an adjustable stud ADS above a plunger PL1 extending upwardly from the three-way valve TWV toward the stud ADS in response to a spring biasing within the valve TWV.

The platen cam carrier 750 is secured by bolt means 752 to the lower end of the cylindrical internal housing 726. A pair of platen cams 754 are mounted on opposite sides of the platen cam carrier 750 by bolt means 756. Each platen cam 754 has an upper vertical cam surface 758, an intermediate inclined cam surface 760, and a lower vertical cam surface 762.

The leak detector assembly 720 includes a container neck gripping mechanism generally designated at 770 which includes a downwardly opening yoke means 772 secured to the frame portion 722 and the vertical main housing 724 by bolt means 774. An aperture formed in the frame portion 722 and the frame adjacent upper portion of the yoke means 772 is aligned with and receives for vertical reciprocation therethrough the internal cylindrical housing 726.

The yoke means 772 carries an opposed pair of cam follower arms 776 pivotally mounted at a position intermediate the ends 786, 788 thereof on pivot pins 778 extending across slots 780 formed in each of the downwardly extending legs 782 of the yoke means 770. The upper ends 786 of the arms 776 rotatably support cam follower rollers 784. The lower ends 788 of the arms have slots 790 formed therein to receive horizontally disposed rods 792 pivotally supported in tooling platen carriers 794. Each platen carrier 794 is slidably mounted on a horizontal pair of spaced shafts 796, each pair of shafts 796 being supported in spaced flanges 798, 800 depending from each of the downwardly extending legs 782 of the yoke means 772.

Opposing neck grasping tooling clamps 802 are connected to platen carriers 794 by bolt means 804. The tooling clamps 802 extend toward each other and have opposing surfaces 806 which are provided with a configuration which will mate with the outer surface of a finished neck portion of a bottle 280.

Shaft supported spring means 808 are positioned between each yoke leg 782 and an upwardly extending flange means 810 of a platen carrier 794 to yieldingly bias or urge tooling platen carriers 794 away from a neck clamping position and to hold cam rollers 784 on the cam surfaces of cams 754.

In operation, the vertically reciprocal stroke cycle of the leak detector assembly 720 is mechanically controlled by the rotary edge cam 490 which is responsive to the one revolution clutch assembly 60. Referring to FIG. 22 there is shown an enlarged view of the cam 490, a graphic cycle representation shown at 482, and the result of rotation of cam 490 on the roller 542 of the rack-pinion-rack leak detector feed means. As noted by the graphic representation 492, the edge of the cam 490 is shaped with respect to the center of the shaft 470 on which it is mounted so that the first 90° of rotation of the cam 490 provides for a very rapid travel of the cam roller 452 away from the center of shaft 470 and, thus through the feed mechanism 540, a rapid lowering of the nozzle 744 and the cap 746 of the air shaft 732 toward the neck and a seating thereof on the neck of the container. The next 180° of rotation of the shaft 470 is a dwell period in which the cap 746 remains seated on the neck of the container while the container is pressurized by air from the air shaft 732 and the nozzle 744 and while the leak test is conducted. The remaining 90° rotation of the cam 490 permits a rapid return of the cam roller 542 to its original position to be ready for the next cycle and thus a rapid vertical lifting of the internal housing 726 to it original position.

Since the operation just described lowers the internal cylinder housing 726 it also lowers the cam platen carrier 750. When the vertically downward travel of the cycle or stroke starts the cam rollers 784 are engaging the cam surfaces 762 on the lower part of the cams 754. As the cam carrier 750 and the edge cams 754 proceed downwardly, the cam rollers 784 engage the cam surfaces 760 which incline upwardly and outwardly away from the cam surfaces 762. This engagement pushes the cam rollers 784 away from the axis of the center line of the container and through the pivoting action of the arms 776 moves the tooling platen carriers 794 toward the center line of the bottle flow through the mechanism. Thus the opposing neck gripping clamps 802 are advanced toward each other and around the finished neck portion of the container 280.

This advance continues until the neck finish portion is firmly grasped and supported by the clamps 802, which supporting occurs as the cam rollers 784 reach the upper cam surfaces 758.

The neck gripping operation is mechanically synchronized with the lowering of the air shaft 732 and the cap 746 so that the seat 748 of cam 746 engages the top of the neck after the neck portion has been clamped. Although the internal housing 726 and thus the platen cam carrier 750 proceed downwardly a bit further to insure a seating of the cap 746 on the neck portion of the bottle, the extended cam surfaces 758 provide a dwell period in the clamp position so that the clamps 802 are held in their clamping position.

After the cap means 746 is seated in sealing engagement by the contact of the resilient seat means 748 with the top of the neck of the bottle, the air shaft 732 halts its downward movement. The internal housing 726 is still continuing its downward movement for a short distance to insure the sealing of the cap 746 on the neck, but this is permitted since the air shaft 732 is slidably mounted in the bearing means 734 inside the hollow cylindrical housing 726. The air shaft 732 is biased downwardly and held in a sealing position by the spring means 738 on the air shaft 732 and received in the counterbore 742.

As the housing 726 continues its last portion of the downward stroke the upper end of the air shaft 732 remains stationary since the lower portion connected to cap 746 is seated and stationary. The bracket BRK is attached to the internal housing 726 and therefore the bracket BRK and the adjustable stud ADS continue on the remainder of the downward stroke of the housing 726 until the stroke is finished. If the finish applied by the facer assembly 600 at the facing station 36 has not been sufficient or if the bottle 280 is too tall for some other reason, the air shaft 732 and thus the three-way valve TWV with the plunger PL1 extending therefrom will be elevated with respect to its normal seated position in the housing 726. If the plunger PL1 extends too far above housing 726 after seating of cam 746, the lower side of the adjustable stud ADS will contact the top of the plunger PL1 permitting the three-way valve TWV to connect all conduits to atmosphere through an exhaust vent to permit pressure loss from the container. Similarly, if a container is too short, if too much has been removed from the neck at the facer station, or if a defective neck prevents the cap 746 from seating properly the container cannot be pressurized. These operations will be more fully explained in the discussion of the complete pneumatic layout hereinafter.

UNLOAD STATION

Figure 32:
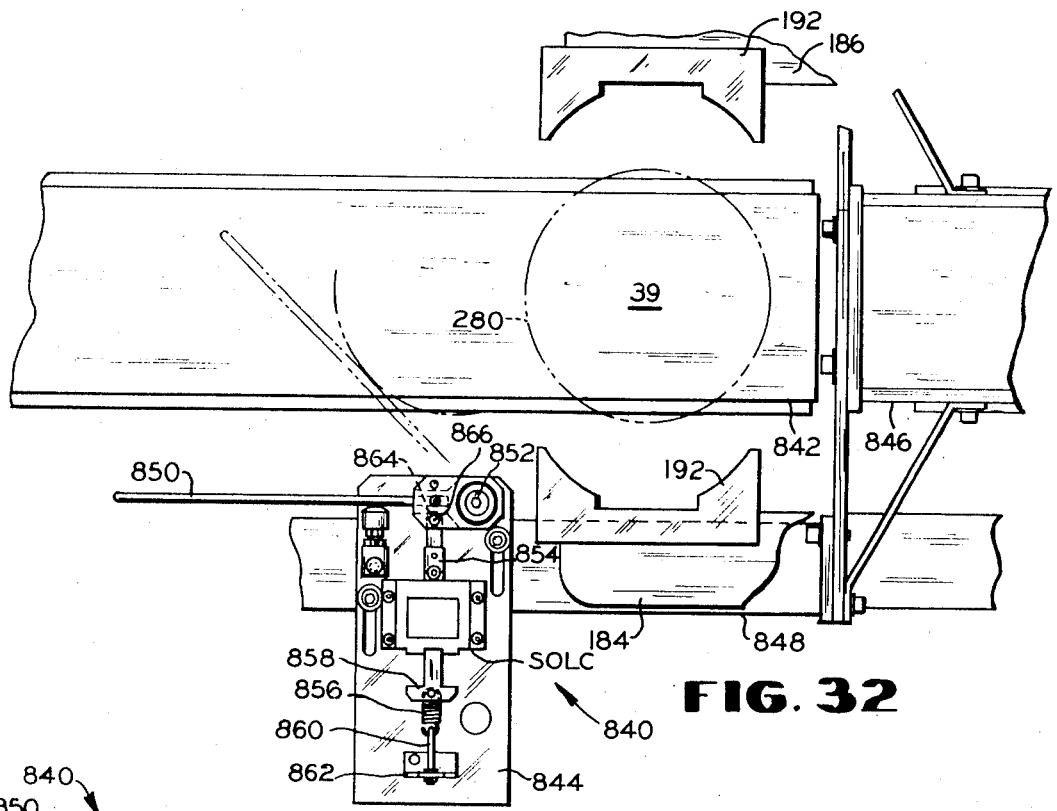
FIG. 32 is a plan view of the eject mechanism and the unload station.
Figure 33:
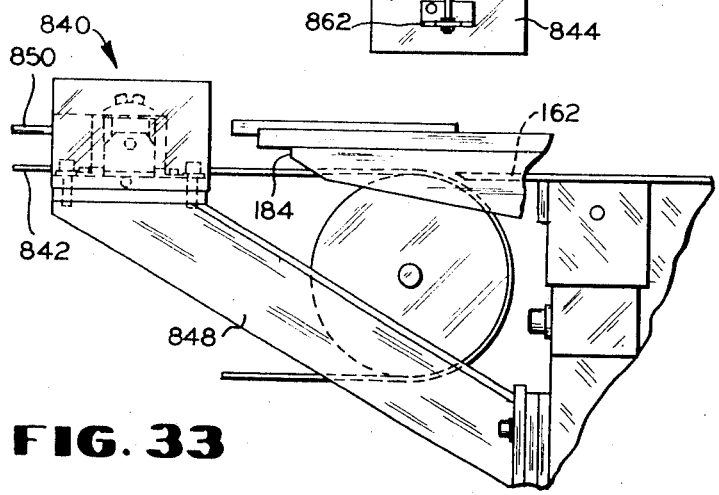
FIG. 33 is a side elevational view of the apparatus of FIG. 32 taken from the left side of the machine.

Referring to FIGS. 32 and 33 there is illustrated the unloading station 39 of the machine 30 which has a reject mechanism assembly generally designated at 840 adjacent an endless belt conveyor 842 which receives containers transferred forward from the leak detecting station 38 on the index forward stroke of the transfer mechanism.

The reject mechanism assembly 840 includes a platform 844 supported downstream from and on a machine frame portion 846 by strut means 848. A bottle or container ejecting arm 850 is pivotally supported next to the endless conveyor 842 on a pivot pin means 852 mounted on the platform 844.

A solenoid SOLC also mounted on platform 846 has an armature 854. The armature 854 is yieldingly biased or held in the retracted position shown, when solenoid SOLC is deenergized, by spring means 856 connected between an end 858 of the armature 854 and an eye bolt 860 secured to a flange 862 extending upwardly from and attached to the platform 844. The conveyor adjacent end 864 of the armature 854 is pivotally connected at 866 to the eject arm 850 intermediate the ejecting portion of the arm 850 and the pivot pin means 852.

As will be noted hereinafter in the description of the electrical control circuit the detection of a container to be rejected, whether the container is dimensionally out of tolerance or whether the container has a leak therein, results in a reject signal which is transmitted to a latching relay at the end of an index forward stroke. The bottle or container 280 has been moved from the leak detection station 38 to the unloading station 39 as shown in FIG. 32. The latching relay closes contacts to energize the solenoid SOLC, causing armature 854 to move forward toward the endless belt conveyor 842 to push the eject arm 850 to the eject position. The eject position of the arm 850 is noted in dotted lines extending across the conveyor 842 and inclined forwardly with respect to the travel thereof. The ejecting movement of the arm 850 may be timed so that the arm 850 will strike the bottle or container 280, knocking it from the conveyor.

Alternatively, the arm 850 may be pushed to the eject position illustrated in dotted lines before the container 280 is conveyed to the eject position by the conveyor 842. The movement of the conveyor 842 forward will cause the bottle 280 to be pushed off the conveyor through sliding contact with the arm 850 in the inclined eject position for disposal.

Since the endless conveyor 842 is traveling constantly, an acceptable bottle 280 deposited on the conveyor 842 by a previous index forward stroke of the transfer mechanism will have passed the eject position during the index rear stroke of the transfer mechanism. More eject position passage time is available during the work cycle of the operation stations. Thus when the arm 850 is moved to the eject position for a rejected container it will miss a preceding container which has been approved as satisfactory by the testing mechanism.

PNEUMATIC CIRCUIT

Figure 34:
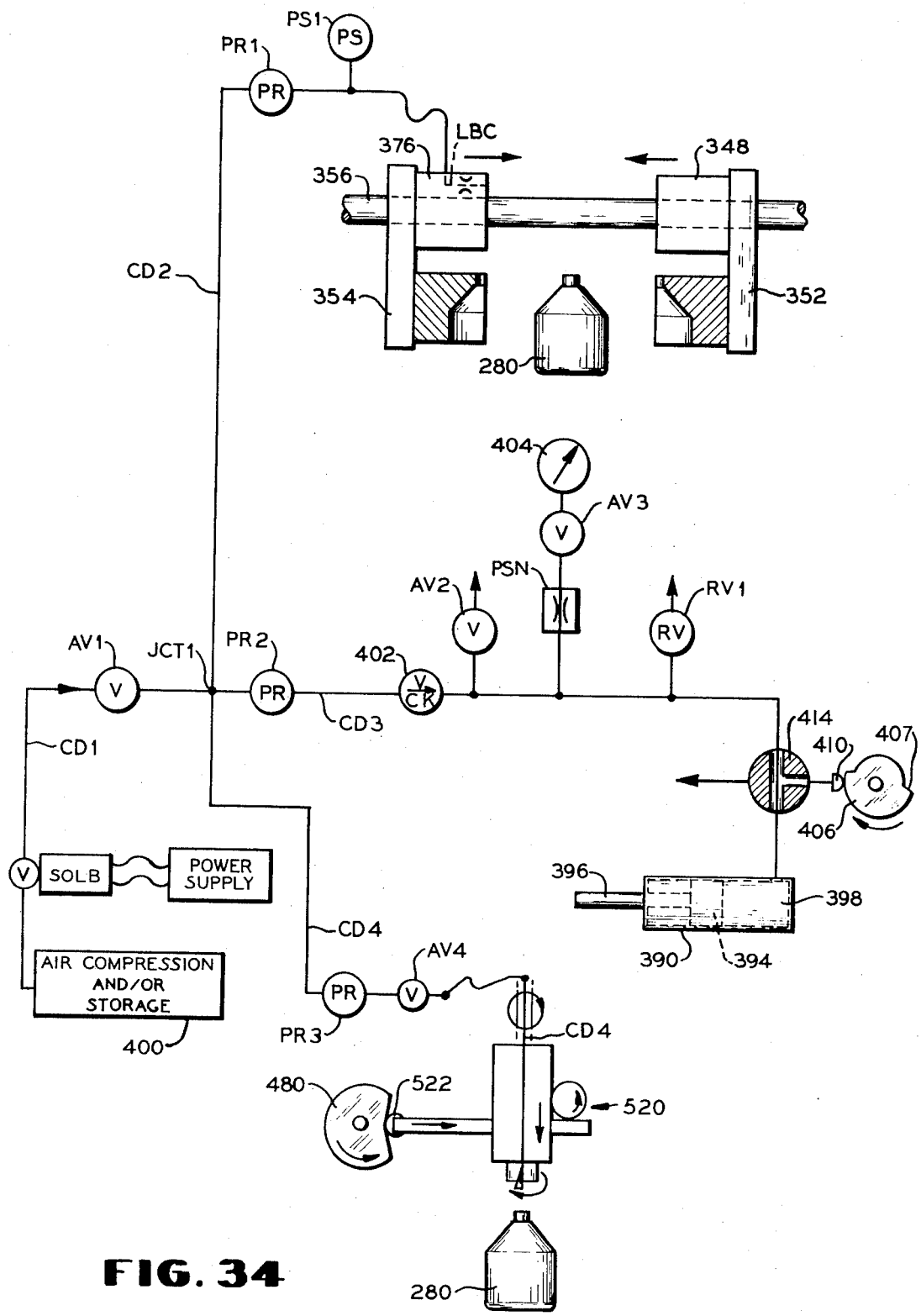
FIG. 34 is a schematic diagram of the air supply and air control circuit for the deflasher and facing stations.
Figure 35:
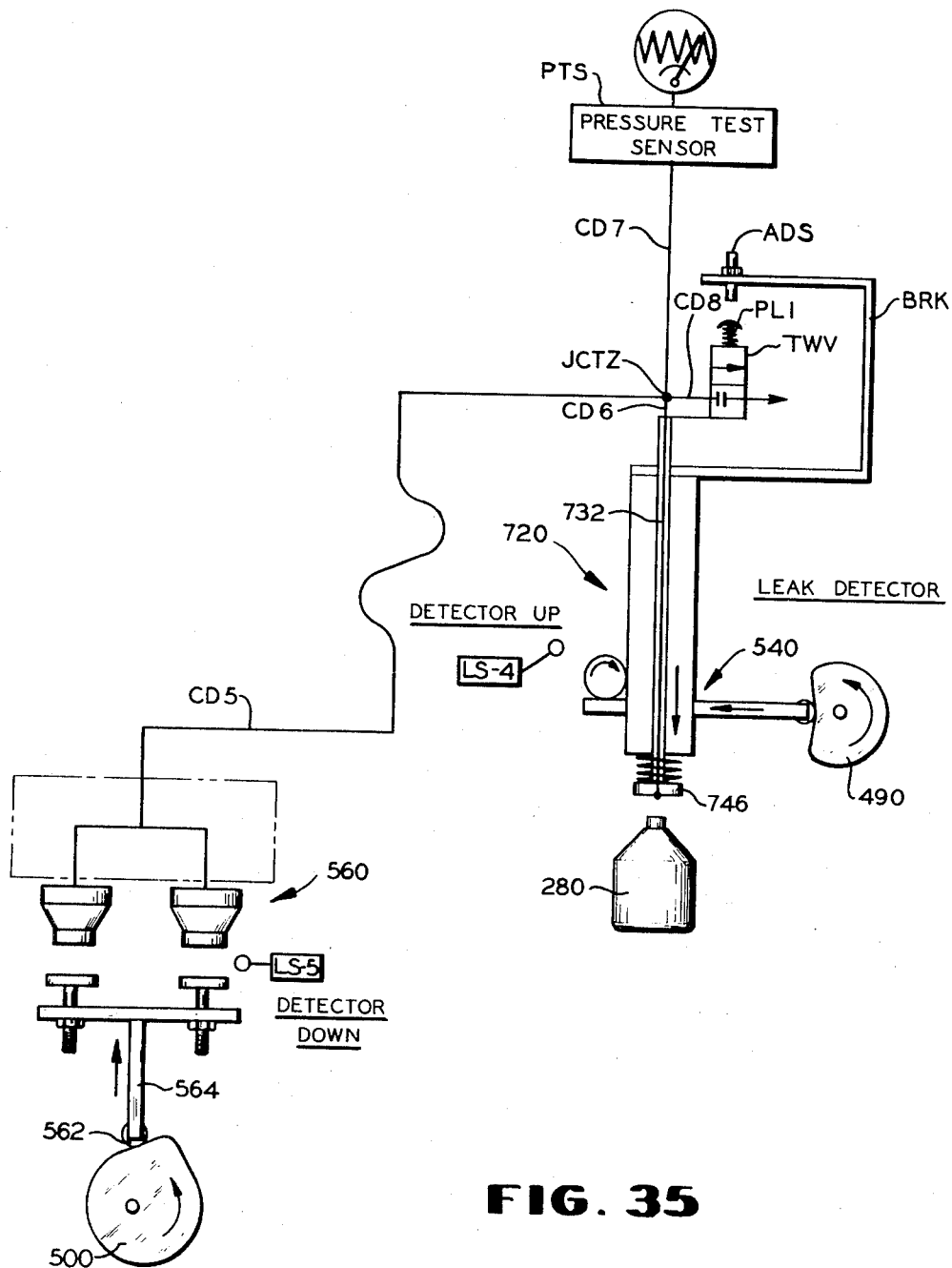
FIG. 35 is a schematic diagram of the air supply and air control circuit for the leak detecting and dimension checking station.

Referring to FIGS. 34 and 35, there is illustrated in schematic diagram form the penumatic control and supply layout of this invention. Referring first to FIG. 34 an air compressor and/or storage unit to provide an air supply 400 is connnected via a solenoid operated valve SOLB, a conduit CD1 and a manual valve AV1 to a junction JCT1. A conduit CD2 carries pressurized air from the junction through a pressure regulator PR1 to a conduit LBC which may be formed in the left bushing member 376 which is slidably mounted on the transverse shafts 356 and carries the left nest platen 354, all of the deflasher assembly 318. A pressure sensitive switch PS1 is connected to the conduit CD2 between the pressure regulator PR1 and the internal conduit LBC. As long as the right nest platen 352 and left nest platen 354 are separated, air flows freely out through conduit LBC in the left bushing member 376. As the left and right platens 354, 352 advance and clamp in a nesting position around a container 280 the flow through conduit LBC will be blocked by the abutment of left bushing member 376 against the right bushing member 348. The pressure sensitive switch PS1 will indicate a nesting and clamping by actuating a first set of PS1 contacts closed and a second set of PS1 contacts open in an electrical control circuit to be described hereinafter. After the deflashing process is completed and the platens 352, 354 separate, air flows freely again from the conduit LBC, and the pressure sensitive switch PS1 actuates the two sets of PS1 contacts to their original position.

A conduit CD3 leads from junction JCT1 through a pressure regulator PR2 and a check valve 402 to the three-way valve 414. The valve 414 is operated by the cam follower 410 and the cam 406, as described hereinbefore, to provide air pressure to and vent air pressure from the air cylinder 390. The valve AV2 is connected to the conduit CD3 to bleed excess air pressure to the atmosphere. A gauge 404 provides a visual indication of the pressure on the downstream side of the check valve 402 and is connected to the conduit CD3 via a needle valve AV3 and a pressure snubber unit PSN, which dampens the effect of air pressure changes in conduit CD3 on valve 404. A relief valve RV1 is also connected to conduit CD3 downstream from the check valve 402 to vent excessive pressure to the atmosphere.

A conduit CD4 leads from junction JCT1 through a pressure regulator PR3 and a needle valve AV4 to the top of the spindle shaft mechanism of the facing spindle assembly. Air is supplied through the hollow facing spindle shaft assembly into a bottle 280 and then flows out of the bottle 280 to prevent chips from the facing operation from falling into the bottle.

Referring to FIG. 35 there is illustrated the bellows assembly 560, shown previously in FIG. 19, for supplying pressurized air through a conduit CD5 to a junction JCT2. As more fully described hereinbefore the cam 500 operates the cam follower shaft 564 via the cam roller 562 to compress the bellows or bulbs of the assembly 560 to supply pressurized air to conduit CD5. A limit switch LS5 is diagrammatically shown and may be responsive to movement of the shaft 564 or the carriage of the bulb compressor pads to indicate whether the leak detector bellows or bulbs are fully compressed and have supplied air under pressure to conduit CD5 and a container 280.

A conduit CD6 leads from the junction JCT2 down to an air shaft 732 of the leak detector assembly 720. The air shaft 732 extends into the bottle or container 280 after the leak detector assembly 720 has been lowered by the rack-pinion-rack assembly 540 under the influence of the cam 490 into a sealingly engaged position on top of the neck of bottle 280.

A conduit CD7 extends from the junction JCT2 to a pressure test sensor PTS. A conduit CD8 extends from the junction JCT2 to the three-way valve TWV. The bracket BRK carries the adjustable stud ADS directly above the plunger PL1 which is spring biased upwardly. A limit switch LS4 is shown diagrammatically to provide an indication of when the detector assembly 720 is at the uppermost portion of its travel.

In operation, after the leak detector assembly 720 has been lowered into sealing contact with the neck of bottle 280, the bellows in assembly 560 are compressed to provide a pressurized air supply in conduit CD5. Since all of the conduits are connected to the junction JCT2, the pressure in conduits CD6, the bottle 280, the conduit CD7, and conduit CD8 is the same. If the bottle 280 has a leak that permits a predetermined amount of pressure to escape within a preset period of time, the pressure test sensor PTS will close a set of contacts PTS in the electrical control circuit to be described hereinafter to provide a reject signal.

As the leak detector assembly 720 is lowered into sealing contact with a bottle 280, the spring biasing of the air shaft 732 and the conduit CD6 which permits effective sealing against the top of the bottle 280 will register, by its final seating position, how tall or short the bottle 280 is. The neck portion of the bottle may not have been finished to the desired height. The bracket BRK is fixed to and lowered with the assembly 720, while the three-way valve TWV is fixed to and floats with the spring biased air shaft 732. Therefore, if the finish on the neck portion of the bottle is too high the conduit CD6 and the three-way valve TWV will be pushed upwardly until the spring biased plunger PL1 is pushed downwardly by the adjustable stud ADS. If this occurs the three-way valve TWV is actuated by the plunter PL1 to open conduit CD8 to the atmosphere and exhaust the pressure in all conduits and in the bottle. This action is detected by the pressure test sensor PTS and, through its set of contacts PTS in the electrical control circuit, it will generate a reject signal for that container 280 even though it might have been sufficiently leakproof otherwise to pass the pressure test.

Similarly, if the bottle is too short or the cap 746 cannot effect a sealing seat on the top of the neck of the bottle, the pressure test sensor PTS will generate a reject signal.

ELECTRICAL CONTROL CIRCUIT

Figure 36:
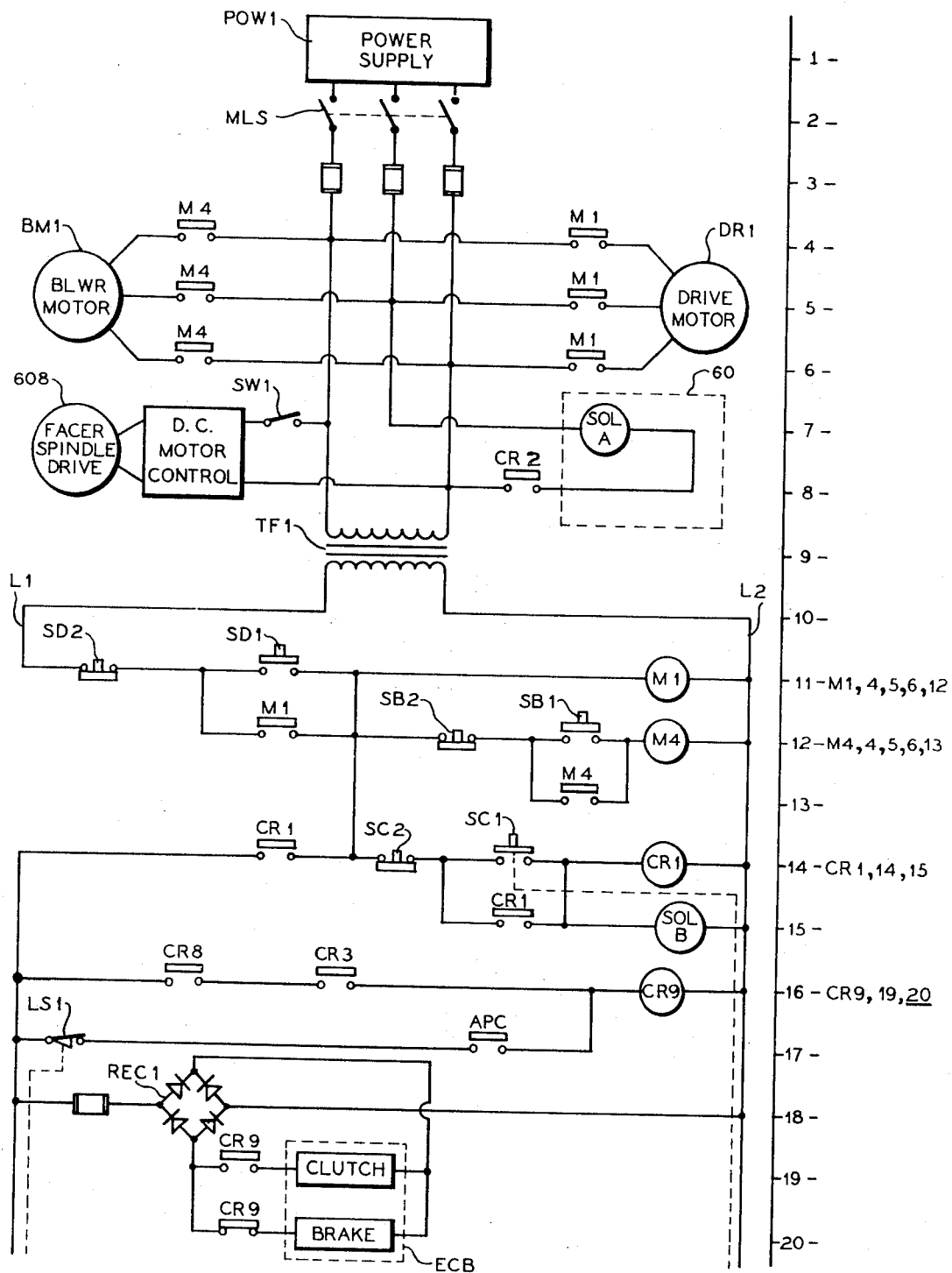
FIG. 36 is a schematic diagram of a first part of the electrical control circuit for the apparatus herein.
Figure 37:
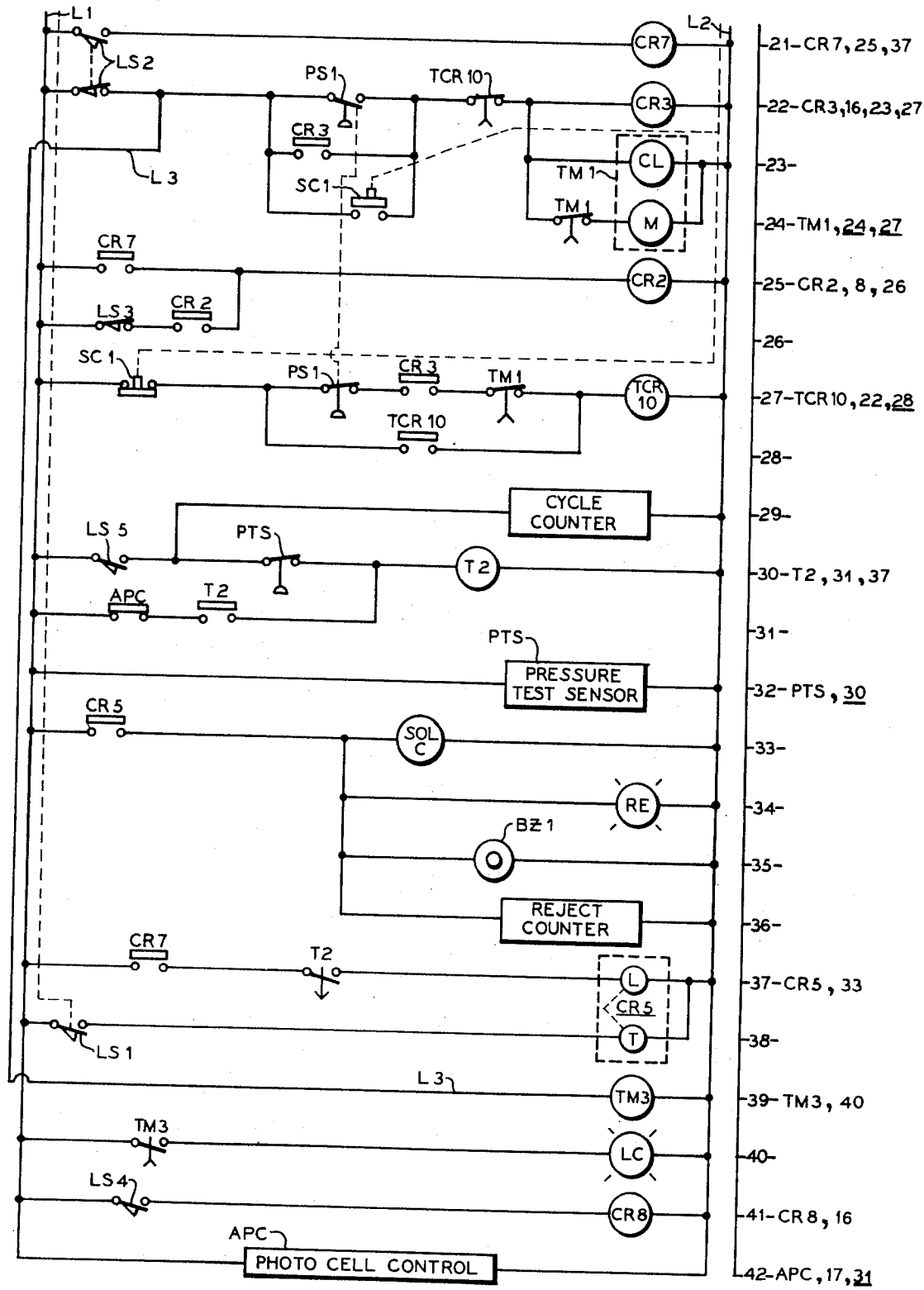
FIG. 37 is a schematic diagram of a second part of the electrical control circuit of this invention.

Referring to FIGS. 36 and 37 there is illustrated a circuit schematic for controlling the preferred embodiment of this invention.

It will be noted that the electrical circuit has been laid out in line diagram form. The components can be readily located by reference to the line number where the component is positioned.

Further, contact switching operations may normally be noted without designating a mechanical tie between the contacts and the actuating means. The contacts may be located at any convenient position, even though quite remote from their actuating means. Cross reference between the actuating means and its associated contacts is easily accomplished by noting in the right hand margin of the drawing the reference character of the actuating means, for example relay CR9, adjacent line number 16, the line in which the contact actuating relay coil is located for energization. Following the reference character the line numbers in which the CR9 contacts appear are noted, i.e., 19, 20. When a contact line number is not underlined, the contacts referred to are noted as "open," e.g. line number 19 in which CR9 contacts appear. When a line number is underlined, the contacts referred to are noted as "closed," e.g., line number 20 in which CR9 contacts appear. Other actuating means and their associated contact are similarly noted.

Since a line diagram form of circuit layout is used there is no requirement for a separate description of the connection of the components. A description of the operation and function of the circuit will locate the connections as the description proceeds.

A main line switch MLS in line 2 is closed to connect main power supply POW1 in line 1 to the control circuit through a transformer TF1 in line 9 and power leads L1 and L2.

A start main drive motor pushbutton SD1 in line 11 is pushed to close the SD1 contacts to energize a main drive motor starter relay M1 in line 11. Contacts M1 in line 12 close to establish a holding circuit around the pushbutton SD1 in line 11 to the relay M1 and to supply power to the rest of the control circuit including the start cycle portion of the circuit. Contacts M1 also close in lines 4, 5, and 6 to start the main drive motor DR1 in line 5. A stop drive pushbutton SD2 in line 11 may be pushed to deenergize relay M1 and drop out the holding contacts M1 in line 12 to stop the main drive motor DR1 and deenergize the remainder of the control circuit.

A switch SW1 in line 7 is closed to energize the facer spindle drive motor 608 through a D.C. motor control circuit in lines 7, 8.

A start blower motor pushbutton SB1 is pushed in line 12 to energize a blower motor relay M4 in line 12 through the holding contacts M1 in line 12. Contacts M4 in line 13 close to establish a holding circuit around the pushbutton SB1 in line 12. Contacts M4 in lines 4, 5, and 6 close to energize a blower motor BM1 in line 5. A stop blower pushbutton SB2 in line 12 may be pushed to individually deenergize relay M4 in line 13 to stop the blower motor BM1. The blower motor BM1 is connected via a conduit (not shown) to the blower inlet 690 in the facer assembly.

The start cycle pushbuton SC1 in line 14 is pushed to energize start cycle relay CR1 in line 14, and to energize solenoid SOLB in line 15 to connect the main air supply 400 in FIG. 34 to the pneumatic circuit.

Energization of cycle relay CR1 closes contacts CR1 in line 15 to establish a holding circuit around the pushbutton SC1 in line 14. Contacts CR1 in line 14 also close to supply power to the remainder of the control circuit. A stop cycle pushbutton SC2 in line 14 may be pushed to deenergize cycle relay CR1 by dropping out holding contacts CR1 in line 15, thereby stopping the cyclic operation.

The start cycle pushbutton SC1 in line 14 is mechanically linked to a second set of SC1 pushbutton contacts in line 24. Closure of SC1 contacts in line 24 energizes the deflasher clamped relay CR3 in line 22 through closed index forward limit switch contacts LS2 and closed deflasher safety timer relay contacts TCR10, both also in line 22.

Contacts CR3 in line 23 close to establish a holding circuit around the SC1 contacts in line 24.

Deflasher clamped relay contacts CR3 also close in line 16 to enable energization of an electric clutch-brake relay CR9 in line 16 through leak detector position relay contacts CR8, also in line 16.

The leak detector contacts CR8 are responsive to the position of the vertically reciprocable portion of the leak detector assembly 720 and close when a leak detector position relay CR8 in line 41 is energized by closure of limit switch contacts LS4, also in line 41. The limit switch LS4 is responsive to the position of the rack-pinion-rack assembly 540 of leak detector assembly 720 and closes contacts LS4 when the reciprocable postion is at the top of its travel.

Deflasher clamped relay contacts CR3 also close in line 27 and, since relay CR3 is maintained energized through its holding circuit in line 23 after the start cycle pushbutton SC1 in line 14 is released, the closure of a set of SC1 pushbutton back contacts in line 27 mechanically linked to SC1 contacts in line 14, readys the deflasher safety timer relay TCR10 in line 27 for energization dependent upon the condition of pressure switch contacts PS1 and reset timer contacts TM1 in line 27. However, since timer TM1 in line 23 was energized immediately on closure of contacts SC1 along with relay CR3 in line 22, it has had an opportunity to time out and open contacts TM1 in line 27 before back contacts SC1 close in line 27, thus preventing energization of the deflasher safety relay TCR10.

Energization of electric clutch-brake relay CR9 in line 16, closes contacts CR9 in line 19 to energize the clutch portion and opens back contacts CR9 in line 20 to deenergize the brake portion of an electric clutch-brake unit ECB in lines 19, 20. The unit ECB connects the main drive motor DR1 to drive the face cam control disc 120 of the transfer mechanism.

The index back limit switch contacts LS1 in line 17 are responsive to the stroke of the transfer mechanism and temporarily open at the end of an index rear or back stroke of the transfer mechanism (and thus are open at the start of a cycle). The limit switch contacts LS1 in line 17 normally maintains the clutch-brake relay CR9 energized through the accumulation photocell contacts APC in line 17, while the transfer mechanism indexes forward, dwells, and indexes back. A photocell unit APC in line 42 is positioned at the loading station and opens contacts APC in line 17 and closes back contacts APC in line 31 if there are no containers on the loading conveyor ready to be processed. The opening of contacts APC in line 17, when contacts CR8 and CR3 in line 16 are open, deenergizes the clutch-brake relay CR9 and disconnects the drive motor DR1 from the transfer mechanism.

It can thus be seen that the electric clutch-brake unit ECB maintains the drive motor DR1 connected to drive the transfer mechanism unless (a) the vertically reciprocable portion of the leak detector assembly is not in its uppermost position during the dwell period of the transfer mechanism after an index back stroke, (b) unless the deflasher clamped relay CR3 is deenergized during the dwell period of the transfer mechanism after an index back stroke and thus at the initial start of the cycle before the index forward stroke of the transfer mechanism because of the detection of a faulty clamping operation of the deflasher assembly, (c) unless the photocell unit APC detects that there are no containers at the loading station to be processed as described above, or (d) unless the transfer mechanism does not index forward or back properly as detected by the index back limit switch contacts LS1 in line 17 and the index forward limit switch contacts LS2 in line 22.

The transfer mechanism moves on the index forward stroke in response to the energization of the clutch-brake relay CR9 as hereinbefore described. When the end of the index forward stroke is reached the position of the transfer mechanism is detected by the limit switch LS2 having a pair of mechanically connected and cam operated switch contacts LS2 in lines 21 and 22.

The index forward contacts LS2 in line 22 temporarily open to deenergize the deflasher clamped relay CR3 in line 22. The deenergization of relay CR3 opens contacts CR3 in lines 16, 23 and line 27.

The index forward contacts LS2 in line 21 temporarily close to energize an index forward relay CR7. The energization of relay CR7 causes the index forward relay contacts CR7 in line 25 to close, energizing a one revolution clutch program relay CR2 in line 25. Clutch program relay contacts CR2 in line 26 close to establish a holding circuit through clutch reset limit switch contacts LS3 in line 26. Clutch program contacts CR2 also close in line 8 to energize the solenoid SOLA in line 7 to cause engagement of the clutch portion of the unit 60 to cause the shaft 320 of the deflasher assembly 318 and the shaft 452 driving the facer and leak detector assemblies to rotate one revolution.

Limit switch LS3 is responsive to the completion of a single revolution output from the one revolution clutch unit 60 to interrupt the holding circuit for the clutch program relay CR2 through the CR2 contacts in line 26. The temporary opening of the limit switch contacts LS3 then resets the clutch program relay CR2 to a deenergized condition for the next cycle and drops out the contacts CR2 in line 8 to deenergize solenoid SOLA and disengage the one revolution output portion of the unit 60.

The temporary closure of the index forward relay contacts CR7 in line 37 during the forward dwell of the transfer mechanism provides a temporary enabling circuit to permit the readout of a container reject signal energizing and latching a latch-trip relay CR5 in lines 37, 38.

Since the single revolution output of the one revolution clutch unit 60 has been initiated by closure of the clutch program contacts CR2 in line 8 the operation of the deflasher, facer and leak detector stations is now started.

Referring first to the deflashing operation, the nest platen carriers 354 and 352 move toward each other. When the nest platens reach a desired bottle clamping or nesting position, the air pressure switch PS, as previously described in the pneumatic circuit, detects the nesting and clamping and so indicates by closing pressure switch contacts PS1 in line 22 while opening pressure switch contacts PS1 in line 27. The two sets of switch contacts PS1 are mechanically lined to insure synchronization of operation.

The closure of the contacts PS1 in line 22 energizes deflasher clamped relay CR3 again, through the now closed limit switch contacts LS2 in line 22. This energization of relay CR3 is the normal cyclic energization, as opposed to the energization of relay CR3 by the "start" pushbutton to enable the machine to start up on an initial cycle. The relay CR3 now closes holding contacts CR3 in line 23 around pressure switch contacts PS1 in line 22, closes contacts CR3 in line 16 to insure continued energization of clutch-brake relay CR9, and closes contacts CR3 in line 27 to no avail since the nesting and clamping contacts PS1 in line 27 are now open.

The pressure switch contacts PS1 in lines 22, 27 stay closed and open, respectively, during the period that the nest platens of the deflasher dwell in the clamping position, while the third knife platen advances, trims and retreats to abut the right nest platen.

If the nest platens were unable to close to a clamping position for some reason, the pressure switch contacts PS1 in line 22 would not close, thereby not energizing the relay CR3 and leaving deflasher clamped relay contacts CR3 open in line 16. When the limit switch contacts LS1 in line 17 open to indicate the return of the transfer mechanism to an index rear position, the energizing circuit to clutch-brake relay CR9 would then be broken. The drive motor DR1 would then be disconnected from the transfer mechanism indicating a malfunction.

If the nest platens close to a proper clamping position and then open after the described nest platen dwell period, the pressure switch contacts PS1 in lines 22, 27 will open and close, respectively, at the end of the nest platen dwell period.

The opening of contacts PS1 in line 22 at the end of the nest platen dwell period has no effect because the holding circuit contacts CR3 in line 23 remain closed.

However, the closing of contacts PS1 in line 27 at the end of the nest platen dwell period would permit energization of the deflasher safety relay timer TCR10 through the still closed deflasher clamped relay contacts CR3, reset timer contacts TM1, and push button back contacts SC1, all in line 27.

The energization of timer relay TCR10 would close holding circuit contacts TCR10 in line 28 around contacts PS1, CR3, and TM1 in line 27. After a desired preset timing period, contacts TCR10 in line 22 would open to deenergize deflasher clamped relay CR3 and thus holding contacts CR3 in line 23 and contacts CR3 in line 16 to disable the clutch-brake connection of drive motor DR1 and stop the machine.

In order to inhibit the operation just described, if the machine is operating properly, a reset timer TM1 has been provided. The closure of pressure switch contacts PS1 in line 22 also energized the reset timer TM1 in lines 23, 24. The TM1 back contacts in lines 24 and 27 open after the timer TM1 has timed out. Contacts TM1 in line 24 open to shut the timer TM1 off, while contacts TM1 in line 27 open just before the end of the prescribed time of the dwell of the nest platens to prevent the above described possibility of energization of deflasher safety timer relay TCR10 by the closure of PS1 contacts in line 27.

Thus, the only time that deflasher safety timer relay TCR10 can be energized is if the nest platens retreat from clamping position during the nest platen dwell period. This can occur, for example, if the nest platens are bounced backward by excessive flash or moil on the container after an initial clamping position has been reached and the pressure switch PS1 has actuated contacts PS1 in lines 22 and 27. Then relay TCR10 would be energized and the operation of the machine would be interrupted as described above.

Referring now to the leak detector station operation, the limit switch contacts LS5 in line 30 are responsive to the delivery of a supply of pressurized air to or pressurization of a container and are closed by the travel of the cam follower shaft 564 which has effected compression of the air bulbs or bellows supplying air to the container. Each closure of the limit switch contacts LS5 in line 30 provides a signal to the cycle counter in line 29. As noted hereinbefore, the LS5 contacts are maintained closed by the limit switch LS5 for about 135° of the rotation of the cam 500 before the last 90° of the cam rotation in the cycle during which the bellows or bulbs are released by the retraction of the cam follower shaft 564.

The pressure test sensor PTS in line 32 has normally closed contacts PTS in line 30, which open in response to the initial receipt of any air pressure by the container. The PTS contacts in line 30 therefore open before LS5 contacts in the same line 30 close.

A reject relay timer T2 in line 30 will be energized if there is a leak in the container which permits loss of a predetermined amount of container pressure and thus closure of the PTS contacts in line 30 before the opening of limit switch contacts LS5 in line 30.

When a leak is detected the reject timer T2 is energized closing contacts T2 in line 37. After the LS5 contacts open the reject timer relay T2 will be deenergized. The timer portion of the unit T2 will time out and contacts T2 in line 37 open. The timing out period of unit T2 is preset to be long enough to retain the reject signal by keeping contacts T2 in line 37 closed to energize the latch portion of latch trip relay CR5 through the index forward contacts CR7 in line 37 which close at the end of an index forward stroke of the transfer mechanism.

Contacts T2 in line 31 are ordinary relay contacts which close when relay timer T2 is energized and open when T2 is deenergized. When the PTS and LS5 contacts are closed in line 30, the relay contacts in line 31 also close. But if there are containers on the loading conveyor waiting to be processed photocell control unit APC in line 42 will have detected the accumulation and will have opened the APC back contacts in line 31 to prevent the establishment of a holding circuit for the reject relay timer T2.

If no containers are present at the loading station, the APC contacts in line 17 will open to deenergize clutch-brake relay CR9 as hereinbefore described. If a leak were detected in the container then being checked, timer T2 would time out and timer contacts T2 in line 37 would open. Since the transfer mechanism of the machine has been stopped the index forward contacts CR7 in line 37 would stay open, no "reject" signal could be given to the latch-trip relay CR5, and the reject signal would be lost when the transfer mechanism was started again.

The contacts APC and T2 in line 31 are utilized to provide a memory circuit for a reject signal. If no containers are present at the loading station then the APC back contacts in line 31 close. Thus, if a reject signal is detected by the closure of relay contacts T2 in line 31, a holding circuit is established around the contacts LS5 and PTS in line 30, maintaining the timer relay T2 energized. When the transfer mechanism is started again by the arrival of a supply of containers at the loading station the back contacts APC in line 31 open, the timer T2 times out, and the timer contacts T2 in line 37 open after the retained reject signal has been given to the relay CR5 through closure of the index forward contacts CR7.

The energization and latching of the relay CR5 closes contacts CR5 in line 33 to energize the solenoid SOLC in line 33 of a mechanism which may mark the container as a reject or remove the container from the unloading conveyor. Closure of the CR5 contacts also lights reject lamp RE in line 34, energizes an audible reject alarm such as a buzzer BZ1 in line 35, and provides a reject signal for a reject counter in line 36.

The latch-trip relay CR5 is tripped or reset when the contacts LS1 in line 38 are temporarily closed to provide a reset signal at the end of an index back stroke of the transfer mechanism.

A cycle timer TM3 in line 39 is connected via lead L3 to be energized each time the index forward limit switch contacts LS2 in line 22 are closed after the temporary opening of the LS2 contacts at the end of an index forward stroke of the transfer mechanism. Timer TM3 starts timing and if it times out before it is reset by the next opening of the index forward limit switch contacts LS2 in line 22, contacts TM3 close in line 40 to illuminate lamp LC in line 40 to indicate that the machine is taking too long to cycle.

It should be noted that the variable diameter pulley 48 and drive motor DR1 combination constitutes a variable speed drive means. All of the cyclically operating mechanisms are driven from the single variable speed drive combination. Therefore, the cycle time for the machine may be increased or decreased as desired by making only a single adjustment. In the present embodiment, this single adjustment is made by changing the effective diameter of the variable diameter pulley 48 by rotating the wheel crank 50. However, it is contemplated that a motor control circuit could be used to vary the speed of a single drive motor for the cyclically operating mechanisms to obtain the same results.

SUMMARY

There has thus been disclosed hereinbefore apparatus having loading and unloading stations for accepting and discharging molded objects and performing secondary finishing and testing operations thereon at a plurality of operation stations between the loading and unloading stations. While the overall apparatus is considered novel there is also disclosed herein a novel transfer mechanism for moving objects from station to station and novel operation performing assemblies at each operation station.

A single means is utilized for driving the transfer mechanism and the operation performing assemblies to enable synchronization of transfers and all work operations within a cycle of the driving means. Means responsive to the presence of a supply of molded objects at the loading station connects the driving means to the transfer mechanism to index an object forward from the loading station to the operations stations. Means are also provided for connecting the driving means to the operation stations which includes a unit for providing a rotary output of a predetermined number of revolutions each time the unit is engaged. Means responsive to the transfer of an object into an operation station engages the rotary output unit.

The transfer unit comprises a spaced plurality of object handling devices operable to grasp an object at one station and release the object at the next station. The transfer unit further includes means for indexing the object handling devices from one station forward to the next station after the object handling devices have been actuated to grasp an object at the one station, for dwelling at the next station while the object handling devices release grasped objects, for indexing the object handling devices from the next station back to the one station after release of grasped objects, and for dwelling at the one station while the object handling devices are actuated to grasp objects at the one station.

The transfer mechanism further includes rotary crank driving means and tie rod assembly means for translating the rotary motion of the rotary crank driving means to reciprocal linear motion to index the object handling devices back and forth. The center of rotation of the rotary crank driving means is offset from the center line of travel of the reciprocal linear motion to provide a more rapid index forward stroke and a relatively slower index back stroke to provide more time within the index cycle to perform operations at the operation stations.

There are several safety features incorporated in the invention. The completion of an index cycle of the transfer mechanism is sensed and means responsive to the index cycle sensing means interrupts operation of the apparatus if an index cycle is not completed. The completion of an operation at an operation station is also sensed and means responsive to the operation completion sensing means interrupts the operation of the apparatus if the operation being sensed is not completed.

One of the operation stations described hereinbefore is a deflashing station which has nest platen carriers operable to nest and hold the objects for flash severing. The reaching of a nesting and holding position of the nest platen carriers is sensed and means responsive to the nesting sensing means interrupts operation of the apparatus if a nesting position is not reached by the nest platens. The deflashing station further includes a knife platen carrier operable to move into and withdraw from a flash severing position while the nest platen carriers are dwelling in a nesting position. The separation of the nest platen carriers during the nesting dwell period is sensed and means responsive to the nest platen separation sensing means interrupts operation of the apparatus if the nest platen carriers separate from the nesting position during the nesting dwell period.

The operation stations also includes a testing station. There is provided means for generating a reject signal in response to failure of a test applied to an object at the testing station and means for storing the reject signal until the object is transferred to the unloading station by the transfer mechanism. A reject mechanism at the unloading station rejects an object which has failed a test. Means responsive to the transfer of the failed object into the unloading station and to the stored reject signal actuates the rejecting means.

Idle stations are interspersed between each of the operation stations. The transfer mechanism is provided with a short transfer stroke between all stations to enable faster transfer of objects into the operation stations, thereby requiring less time to transfer an object into an operation station and permitting more time within a given period for processing objects at the operation stations. Means at the idle stations are provided for maintaining orientation of the objects to permit the transfer of a properly oriented object from an idle station to a succeeding operation station.

One of the main features of the transfer mechanism is a contractible-extensible tie assembly means which connects the rotary crank driving means to the handling device support means. The tie assembly means includes a first connecting member, a second connecting member, and yielding biasing means linking the first and second connecting members and holding the two connecting members in a predetermined stationary position with respect to each other during the translation of motion from the rotary driving means to the handling device support means between stations. A stop means is positioned to contact the handling device support means before the end of each reciprocal stroke and hold the handling device support means at each station to define an index stroke, while the tie assembly contracts and extends in response to handling device support means contact with the stop means. This creates a dwell period for each station for operation of the handling devices, since the length of the natural reciprocal stroke which would otherwise be imparted by the rotary crank to the handling device support means is greater than the index stroke, which is the distance between stations.

The object handling devices comprise opposed pairs of object grasping means or transfer fingers. Each of the pair of transfer fingers is advanced toward the other during the dwell period at the end of the index back stroke of the transfer mechanism to grasp an object. The transfer fingers are withdrawn from each other during the dwell period at the end of an index forward stroke to release an object. The means for advancing and withdrawing the opposed pairs of object grasping means includes a member having a linear cam surface formed thereon which extends parallel to the line of travel between stations. A lever arm extending from a shaft journally supported in the means for carrying and guiding the handling device support means is responsive to position of the linear cam surface. In response to the completion of each index stroke, the linear cam surface means is shifted between two positions to cause the lever arm to advance and withdraw the opposed pair of object grasping means toward and away from each other.

A deflashing station is provided in the apparatus which comprises a knife platen carrier on one side of the station. The knife platen carrier is advanced to a flash severing position during the work portion of the cycle, i.e., in response to an object being placed in the station for deflashing, and is withdrawn to a starting position after the flash is severed from the object.

A first nest platen carrier is located on one side of the station and a second nest platen carrier is located on the other side of the station. Means responsive to the advance of the knife platen carrier advances at least one of the nest platen carriers toward the other of the nest platen carriers to a position which nests and holds the object for flash severing. The nesting position is attained before the knife platen carrier reaches a flash engaging position. Means responsive to the withdrawal of the knife platen carrier from an engagement position with the object withdraws the one nest platen carrier away from the other of the nest platen carriers to release the nested object.

A yieldingly biasing means is mounted on the knife platen carrier so that an inwardly facing portion of one of the nest platen carriers is urged against an outwardly facing portion of the knife platen carrier until a nesting position is reached. After the one nest platen carrier reaches the nesting position, the continued advance of the knife platen carrier increases the biasing force to hold the one nest platen carrier more firmly in nesting position.

Means are provided for reducing the biasing force of the yieldingly biasing means in response to the start of withdrawal of the knife platen carrier, to reduce the increased force from the yieldingly biasing means which is now pushing outwardly on the knife platen carrier during withdrawal. This outward push of the biasing means attempts to overdrive the driving means for the deflasher station. Since all of the operation stations are mechanically linked this additive push or drive could be transmitted to the other stations and have undesirable effects thereon.

In the preferred embodiment disclosed herein the yieldingly biasing means includes an air spring and thus the means for reducing the biasing force includes means for reducing air pressure in the air spring in response to the start of withdrawal of the knife platen carrier. The air pressure may be reduced to that level necessary only to maintain the nest platen carriers in nested position or, as disclosed herein, the air spring pressure may be vented to the atmosphere. If the air spring pressure is vented to the atmosphere an auxiliary spring means may be utilized positioned between the knife platen carrier and the one nest platen carrier, having a spring force which is sufficient only to hold the nest platen carriers in the nesting position during the nesting dwell period. It is to be noted that a mechanical spring assembly may be utilized in place of the air spring assembly.

The apparatus also includes an operation station for performing machining operations on plastic containers. The machining operation stations may comprise a rotatable tool carrying means, a housing for journally supporting the rotatable tool carrying means, means for reciprocally moving the housing toward and away from a container, means for gripping the container to hold the container in a position enabling a machining operation by tooling carried by the rotatable tool carrying means, and means responsive to movement of the housing toward a container for actuating the gripping means to grip and hold the container before the tooling engages the container. Movement of the housing away from the container will cause the gripping means to release its hold on the container after the tooling is disengaged from the container.

There was also disclosed and described herein apparatus for testing containers which have an opening. Gas conduit means having an insertion end is supported away from a container opening position. Means adjacent the insertion end of the gas conduit and spaced a predetermined distance from a container opening position is provided for sealing the opening of the container when the insertion end of the gas conduit means is properly received in the opening of the container.

Means are provided for moving the insertion end of the gas conduit means and the sealing means adjacent thereto and a container opening with respect to each other, to close the predetermined distance separating the insertion end and the sealing means and the container opening. While the movement just described is disclosed herein as movement of the insertion end and the sealing means only, it is to be noted that movement of the container alone, as well as movement of both the container and the gas conduit means simultaneously, is contemplated by this arrangement. It is preferable, however, to maintain the object on the platform support of the fixed conveyor bed as shown herein, since no additional mechanisms are necessary for lifting or otherwise handling the container.

A gas supplying means includes a bellow arrangement and means, responsive to the closure of the predetermined distance between the sealing means and the container opening position, for operating the bellow arrangement to supply gas under pressure to the gas conduit. The pressurization of the container is sensed. Means responsive to the pressurization sensing means generates a dimensional signal if no pressurization occurs at all. If, after pressurization, a loss of pressure above a certain amount is detected, a signal is generated indicating a leak in the container.

The means illustrated herein for closing the distance between the insertion end of the gas conduit and the sealing means and a container opening includes a housing journally carrying the gas conduit therein. The housing is supported for reciprocal movement toward and away from the container opening position and a cam assembly means is utilized for imparting the reciprocal movement to the housing.

A means, similar to that described for the machining station, is provided for gripping the container to hold the container opening in a position to receive the insertion end of the gas conduit and the sealing means. The gripping means is actuated by means responsive to movement of the housing carrying the gas conduit toward a container opening.

In conclusion, it is pointed out that while the illustrated examples constitute practical embodiments of my invention, I do not limit myself to the exact details shown since modification of these details may be made without departing from the spirit and scope of this invention.

I claim:

1. Apparatus for performing machining operations on plastic containers at a finishing station comprising
   a. rotatable tool carrying means;
   b. a housing for journally supporting said rotatable tool carrying means including means for rapidly advancing said housing toward said container until said housing reaches a tool engaging position and then advancing said housing at a tool working speed;
   c. means for reciprocally moving said housing toward and away from a container;
   d. means for gripping said container to hold said container in a position enabling a machining operation by tooling carried by said rotatable tool carrying means;
   e. means responsive to movement of said housing toward a container for actuating said gripping means to grip and hold said container before tooling engages said container, and further responsive to movement of said housing away from said container for causing said gripping means to release its hold on said container after tooling is disengaged from said container, and
   f. means for interrupting said tool working speed advance of said housing to cause machining cuttings to be shorter.

2. Apparatus for performing machining operations on plastic containers at a finishing station comprising
   a. rotatable tool carrying means;
   b. a housing for journally supporting said rotatable tool carrying means;
   c. means for reciprocally moving said housing toward and away from a container including
      i. rack means carried by said housing,
      ii. pinion gear means pivotally supported in meshed relationship with said housing rack means, and
      iii. means for cyclically rotating said pinion gear means in a first direction to advance said housing toward said container and then rotating said pinion gear means in a second direction to withdraw said housing away from said container;
   d. means for gripping said container to hold said container in a position enabling a machining operation by tooling carried by said rotatable tool carrying means;

e. means responsive to movement of said housing toward a container for actuating said gripping means to grip and hold said container before tooling engages the container, and further responsive to movement of said housing away from said container for causing said gripping means to release its hold on said container after tooling is disengaged from said container.

3. Apparatus as defined in claim 2 in which said pinion gear rotating means includes cam follower means and cam means, said cam means having a first surface causing rapid rotation of said pinion gear means during a first portion of said rotation in said first direction to rapidly advance said housing toward said container, said cam means having a second surface causing relatively slower rotation of said pinion gear means during a second portion of said rotation in said first direction to advance said housing at a tool working speed for engagement and tool working on said container.

4. Apparatus as defined in claim 3 which further includes means for yieldingly biasing said housing away from said container to maintain the engagement of said cam follower means with said cam means of said pinion gear rotating means.

5. Apparatus as defined in claim 3 in which said cam means has a third surface causing said housing to dwell at the end of the travel of said pinion gear means in the first direction to permit a finishing operation by tooling carried on said rotatable tool carrying means.

6. Apparatus as defined in claim 3 in which said cam means has spaced detent surfaces formed in said second cam surface to interrupt the machining advance of said housing to cause machine cuttings from said container to be shorter.

7. Apparatus for performing machining operations on plastic containers at a finishing station comprising
a. rotatable tool carrying means;
b. a housing for journally supporting said rotatable tool carrying means including means for rapidly advancing said housing toward said container until said housing reaches a tool engaging position and then advancing said housing at a tool working speed;
c. means for reciprocally moving said housing toward and away from a container;
d. means for gripping said container to hold said container in a position enabling a machining operation by tooling carried by said rotatable tool carrying means;
e. means responsive to movement of said housing toward a container for actuating said gripping means to grip and hold said container before tooling engages said container, and further responsive to movement of said housing away from said container for causing said gripping means to release its hold on said container after tooling is disengaged from said container, and
f. means for conducting gas under pressure into a container during a machining operation causing gas to flow out of said container to prevent debris from the machining operation from falling into the container.

* * * * *